United States Patent [19]
Powell

[11] Patent Number: 6,157,905
[45] Date of Patent: *Dec. 5, 2000

[54] IDENTIFYING LANGUAGE AND CHARACTER SET OF DATA REPRESENTING TEXT

[75] Inventor: Robert David Powell, Issaquah, Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/987,565

[22] Filed: Dec. 11, 1997

[51] Int. Cl.[7] ...................................................... G06F 17/30
[52] U.S. Cl. ................................... 704/2; 704/9; 707/536
[58] Field of Search ........................ 707/1–10, 100–104, 707/200–206; 704/231, 235, 251; 382/155, 159, 161, 215, 226, 230, 310; 711/1; 705/17

[56] References Cited

U.S. PATENT DOCUMENTS

| | | | |
|---|---|---|---|
| 5,261,009 | 11/1993 | Bokser | 382/230 |
| 5,418,951 | 5/1995 | Demashek | 395/600 |
| 5,428,707 | 6/1995 | Gould et al. | 704/231 |
| 5,477,451 | 12/1995 | Brown et al. | 704/9 |
| 5,510,981 | 4/1996 | Berger et al. | 704/2 |
| 5,592,667 | 1/1997 | Bugajski | 707/102 |
| 5,594,809 | 1/1997 | Kopec et al. | 382/161 |
| 5,608,622 | 3/1997 | Church | 704/3 |
| 5,752,227 | 5/1998 | Lyberb | 704/235 |
| 5,761,687 | 6/1998 | Hon et al. | 707/531 |
| 5,768,603 | 6/1998 | Brown et al. | 704/9 |
| 5,774,588 | 6/1998 | Li | 382/230 |
| 5,805,832 | 9/1998 | Brown et al. | 711/1 |
| 5,878,390 | 3/1999 | Kawai et al. | 704/231 |
| 5,883,986 | 3/1999 | Kopec et al. | 382/310 |
| 5,982,933 | 11/1999 | Yoshii et al. | 382/226 |
| 6,070,140 | 5/2000 | Tran | 704/275 |
| 6,073,098 | 6/2000 | Buchsbaum et al. | 704/255 |

FOREIGN PATENT DOCUMENTS

WO97/16796  5/1997  WIPO.

OTHER PUBLICATIONS

Hayes, Brian, "Computer Recreations: A progress report on the fine art of turning literature into drivel." *Scientific American*, vol. 249, pp. 18–28, Nov., 1983.

Kikui et al., "Cross–Lingual Information Retrieval on the WWW," ECA196, 12th European Conference on Artificial Intelligence, MULSAIC96 Workshop, 1996, pp. 1–6.

Kikui, G., "Identifying the Coding System and Language of On–line Documents on the Internet," Sixteenth International Conference of Computational Linguistics (Coling), Aug. 1996, pp. 652–657.

*Primary Examiner*—Ruay Lian Ho
*Attorney, Agent, or Firm*—Klarquist Sparkman Campbell Leigh & Whinston, LLP

[57] ABSTRACT

The present invention provides a facility for identifying the unknown language of text represented by a series of data values in accordance with a character set that associates character glyphs with particular data values. The facility first generates a characterization that characterizes the series of data values in terms of the occurrence of particular data values on the series of data values. For each of a plurality of languages, the facility then retrieves a model that models the language in terms of the statistical occurrence of particular data values in representative samples of text in that language. The facility then compares the retrieved models to the generated characterization of the series of data values, and identifies as the distinguished language the language whose model compares most favorably to the generated characterization of the series of data values.

55 Claims, 12 Drawing Sheets

IDENTIFYING LANGUAGE AND CHARACTER SET OF DATA REPRESENTING TEXT

TECHNICAL FIELD

The present invention is directed toward the field of text analysis, and, in particular, to the field of statistical text analysis.

BACKGROUND OF THE INVENTION

It is common for modern computer systems to provide facilities for storing and processing data representing text. Bodies of data stored by a computer system that represent a textual document are referred to as "digital document representations." Digital document representations are stored in a computer system, like other data, as a series of values called "bytes." Text is converted to these byte values using a "character set"—a mapping between the identities of different characters, herein referred to as "character glyphs," and different byte values. Character sets, also referred to as "code pages," are generally defined by standards organizations, such as the American National Standards Institute ("ANSI") or the International Standards Organization ("ISO"). Some character sets, called "multiple-byte character sets," map each character glyph to a value comprised of two or more bytes. It is generally possible to correctly display the document represented by a digital document representation only where the character set used to create the digital document representation is known. Converting a digital document representation from its current character set into a different target character set is also typically possible only where the current character set of the digital document representation is known.

Text generally comprises a series of words each taken from one or more languages. Natural language processing tools, such as spelling checkers, grammar checkers, and summarizers, may be applied to such documents. In order to correctly process a document, however, these tools must be advised of the language or languages from which the words in the document are taken. For example, when a spell checker tool encounters the word "bitte" in a document known to be in German, it does not regard the word as misspelled. However, when the spell checker tool encounters the same word in a document known to be in English, it regards the word as a misspelling of the word "bitter." Some information retrieval tools, such as word breakers (which identify the boundaries between words) and word stemmers (which remove suffixes in order to match different words having the same root), also must be advised of the language or languages occurring in digital document representations upon which these tools operate. In addition to the needs of automated tools, knowledge of the language in which the document is written is useful to human readers, who may read only one or a small handful of the large number of languages in which documents are written, to determine whether they will be able to read the document.

Thus, it is generally desirable for each digital document representation that is stored to be accompanied by an explicit indication of the character set used to generate it and the language or languages from which its words are taken. Wile such information is stored for many digital document representations, especially those that have been created recently, it is unavailable for many other digital document representations. For example, many of the HTML documents available via the world wide web fail to identify their character sets and languages.

In the case of some digital document representations, information identifying the character set and language of the digital document representation has never been associated with the digital document representation. This is often the case where this information was originally implied by the identity of the computer on which it was stored. For example, this information is implicit in digital document representations originally created in a single-language, single-character set environment. When such digital document representations are moved to a computer system that uses several languages and character sets, or made available to such computer systems via a network such as the Internet, the character set and language of such digital document representations is unavailable.

For other digital document representations, information identified in the character set and language of the digital document representation was at some point associated with the digital document representation, but is not presently available. For instance, such information may be stored in a separate file that is at some point deleted. On the other hand, the information may still be in existence, but nonetheless be unavailable. For instance, the file containing the information may be inaccessible to the user or program trying to determine the character set and language of the digital document representation. Such information may further be accessible, but be in a format that is unintelligible to the user or program seeking to determine the character set and language of the digital document representation. Thus, for a variety of reasons, the character set and language of a digital document representation may be unavailable.

Because the language and character set needed to display and process digital document representations are frequently unavailable, an automated approach to discerning the character set and language or languages of a digital document representation, especially one that has reasonable storage requirements and is straightforwardly extensible to new character sets and languages, would have significant utility.

SUMMARY OF THE INVENTION

The present invention provides a software facility ("the facility") that, given raw data that represents a textual document in some language expressed using some character set, automatically identifies that language and character set. The facility first generates a statistical model of documents in each of a number of known languages and character sets in a "training phase," then applies these models to identify the language and character set of an input document in a "detection phase."

The statistical models of languages and character sets used by the facility are tailored to emphasize character values that tend to distinguish between different languages and character sets, while at the same time minimizing the amount of space in the models dedicated to character values that do not tend to differentiate languages or character sets, by the use of specialized reductive mappings.

In the training phase, the facility generates the statistical models of languages and character sets used in the detection phase to identify the language and character set of input documents. For each combination of language and character set to be detected, the facility reads sample documents known to be in that language and character set, each comprising a series of byte values. The facility then (A) maps the byte values in the series from the 256 different possible values that can be represented in a byte to a smaller number of possible values, (B) records the number of times that each different fixed-length series of mapped byte values, or "n-grams," occurs in the mapped version of document, (C) aggregates these "frequency statistics" for each language and character set, and (D) normalizes the frequency statistics across the languages and character sets. N-grams of different lengths, as well as different mappings, are preferably used based on the characteristics of each language and character set. The facility further adjusts the frequency statistics to emphasize high-frequency n-grams whose occurrence tends to distinguish a document of one language and character set from documents of other languages and character sets, and to de-emphasize high-frequency n-grams whose occurrence does not tend to distinguish a document of one language and character set from documents of other languages and character sets.

In the detection phase, the facility uses the normalized and adjusted frequency statistics generated in the training phase to identify the language and character set for an input document whose language and/or character set is unknown. The facility first maps the byte values of the input document to a smaller number of possible values using the same mapping(s) used in the training phase. The facility then determines the number of times each n-gram occurs in the mapped input document. For each language, the frequency of each n-gram in the mapped input document is multiplied by the frequency of the same n-gram in the training frequency statistics for the current language, and these products are summed. The sum for each language represents the relative likelihood that the language is the one in which the input document is written. After the language having the largest sum is identified, this detection process is repeated using character set statistics for that language to determine in which of the known character sets for the identified language the input document is written.

The facility preferably analyzes contiguous units of training and input documents whose length corresponds to the length of a typical paragraph. In this way, when a document contains text in more than one language or character set, the facility can identify each of these languages and character sets.

The facility preferably further uses similar statistical analysis techniques to identify the language or languages of digital document representations expressed in the large Unicode character set. In identifying some groups of similar languages in Unicode digital document representations, the facility preferably utilizes custom reductive mappings automatically generated to differentiate between languages in the group.

DETAILED DESCRIPTION OF THE INVENTION

Figure 1:
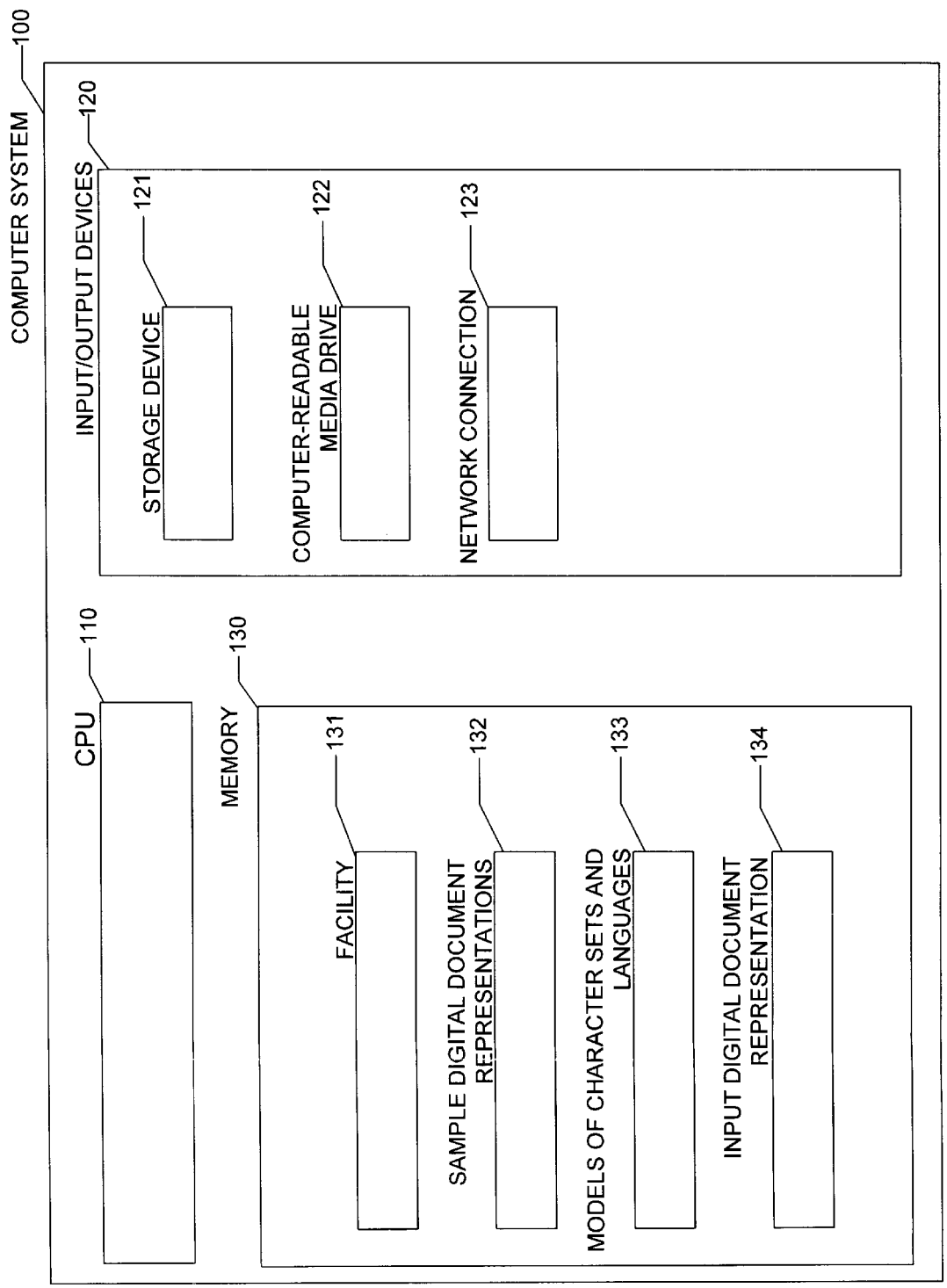
FIG. 1 is a high-level block diagram showing the computer system upon which the facility preferably executes.

The present invention provides a software facility ("the facility") that, given raw data that represents a textual document in some language expressed using some character set, automatically identifies that language and character set. The facility first generates a statistical model of documents in each of a number of known languages and character sets in a "training phase," then applies these models to identify the language and character set of an input document in a "detection phase."

The statistical models of languages and character sets used by the facility are tailored to emphasize character values that tend to distinguish between different languages and character sets, while at the same time minimizing the amount of space in the models dedicated to character values that do not tend to differentiate languages or character sets, by the use of specialized reductive mappings.

In the training phase, the facility generates the statistical models of languages and character sets used in the detection phase to identify the language and character set of input documents. For each combination of language and character set to be detected, the facility reads sample documents known to be in that language and character set, each comprising a series of byte values. The facility then (A) maps the byte values in the series from the 256 different possible values that can be represented in a byte to a smaller number of possible values, (B) records the number of times that each different fixed-length series of mapped byte values, or "n-grams," occurs in the mapped version of document, (C) aggregates these "frequency statistics" for each language and character set, and (D) normalizes the frequency statistics across the languages and character sets. N-grams of different lengths, as well as different mappings, are preferably used based on the characteristics of each language and character set. The facility further adjusts the frequency statistics to emphasize high-frequency n-grams whose occurrence tends to distinguish a document of one language and character set from documents of other languages and character sets, and to de-emphasize high-frequency n-grams whose occurrence does not tend to distinguish a document of one language and character set from documents of other languages and character sets.

In the detection phase, the facility uses the normalized and adjusted frequency statistics generated in the training phase to identify the language and character set for an input document whose language and/or character set is unknown. The facility first maps the byte values of the input document to a smaller number of possible values using the same mapping(s) used in the training phase. The facility then determines the number of times each n-gram occurs in the mapped input document. For each language, the frequency of each n-gram in the mapped input document is multiplied by the frequency of the same n-gram in the training frequency statistics for the current language, and these products are summed. The sum for each language represents the relative likelihood that the language is the one in which the input document is written. After the language having the largest sum is identified, this detection process is repeated using character set statistics for that language to determine in which of the known character sets for the identified language the input document is written.

The facility preferably analyzes contiguous units of training and input documents whose length corresponds to the length of a typical paragraph. In this way, when a document contains text in more than one language or character set, the facility can identify each of these languages and character sets.

The facility preferably further uses similar statistical analysis techniques to identify the language or languages of digital document representations expressed in the large Unicode character set. In identifying some groups of similar languages in Unicode digital document representations, the facility preferably utilizes custom reductive mappings automatically generated to differentiate between languages in the group.

FIG. 1 is a high-level block diagram showing the computer system upon which the facility preferably executes. As shown in FIG. 1, the computer system 100 comprises a central processing unit (CPU) 110, input/output devices 120, and a computer memory (memory) 130. Among the input/output devices is a storage device 121, such as a hard disk drive; a computer-readable media drive 122, which can be used to install software products, including the facility, which are provided on a computer-readable medium, such as a CD-ROM; and a network connection 123 for connecting the computer system 100 to other computer systems (not shown). The memory 130 preferably contains a facility 131, sample digital document representations 132 used to generate models of character sets and languages 133, and an input digital document representation whose character set and language(s) the facility is to determine. While the facility is preferably implemented on a general-purpose computer system configured as described above, those skilled in the art will recognize that it may also be implemented on computer systems having different configurations.

Figure 2:
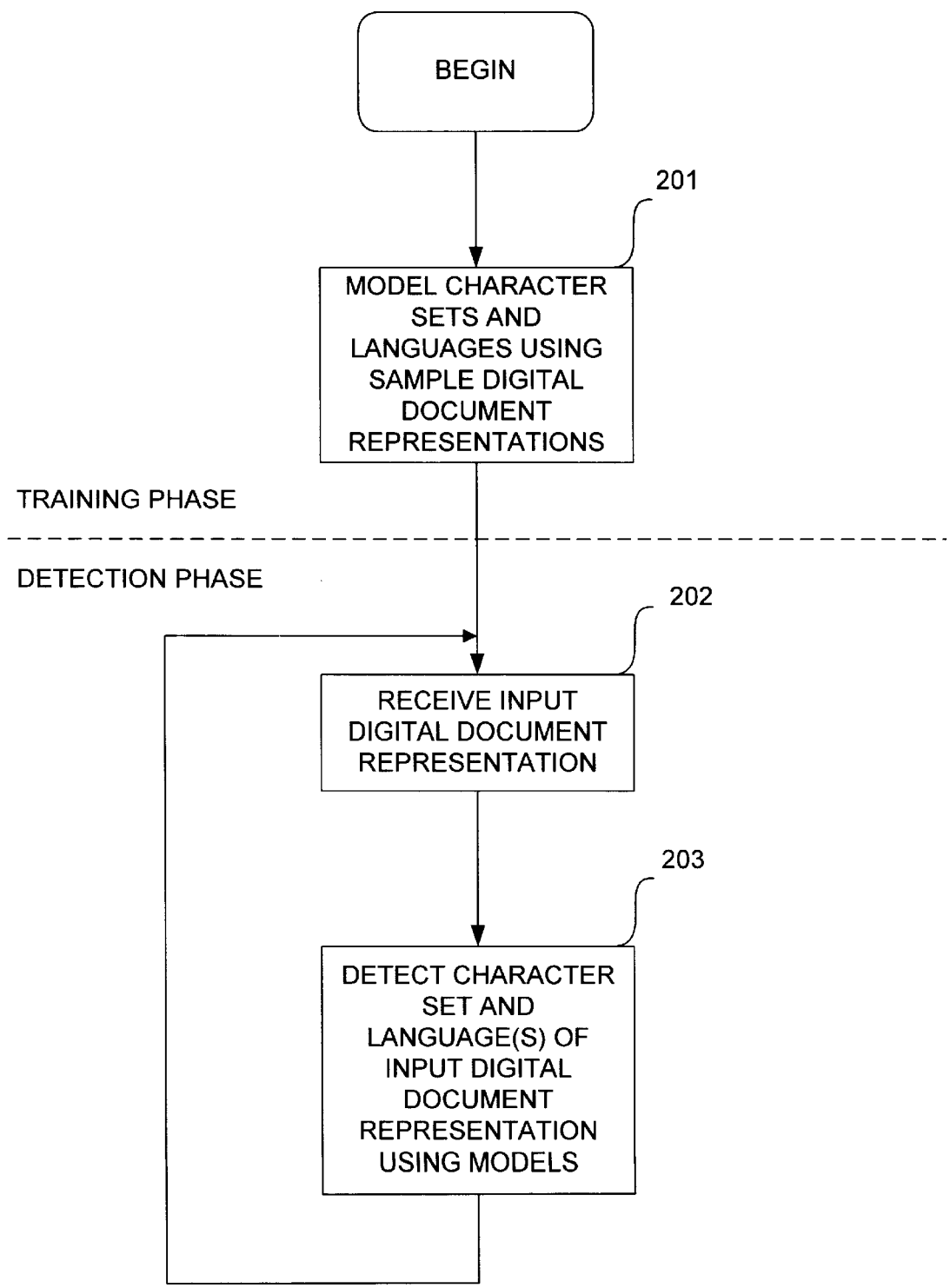
FIG. 2 is an overview flow diagram showing the phases in which the facility operates.

FIG. 2 is an overview flow diagram showing the phases in which the facility operates. In step 201, in the training phase, the facility models the character sets and languages that it is to detect using sample digital document representations known to have been generated in these character sets and known to primarily contain these languages. The sample digital document representations used in step 201 are preferably obtained from newspaper stories and legal opinions discussing subject matters intrinsic to a locale to which its primary language is indigenous. That is, sample digital document representations are sought that have local content, such as newspaper articles and judicial opinions, as the vocabulary used in such digital document representations is likely to distinguish the primary language of the sample digital document representation from other languages. Step 201 is discussed in greater detail below in conjunction with FIG. 3.

The facility performs step 201 once. After step 201 has been performed, the training phase concludes. The models generated in the training phase in step 201 are used in the detection phase to detect the character set and language(s) in each of any number of input digital document representations. In step 202, the facility receives a new input digital document representation. In step 203, the facility detects the character set and language(s) of the input digital document representation received in step 202 using the models generated in step 201. The details of step 203 are discussed in greater detail below in conjunction with FIG. 3. After detecting the character set and language(s) of the input digital document representation in step 203, the facility continues in step 202 to receive the next input digital document representation, thus remaining in the detection phase. While FIG. 2 portrays the facility as never reentering the training phase, those skilled in the art will appreciate that it may be desirable to repeat the training phase in order to incorporate additional sample digital document representations in the models generated in the training phase, either to extend the facility to detect additional languages and character sets, or to enhance the models for existing languages and character sets using the text of additional sample digital document representations.

Figure 3:
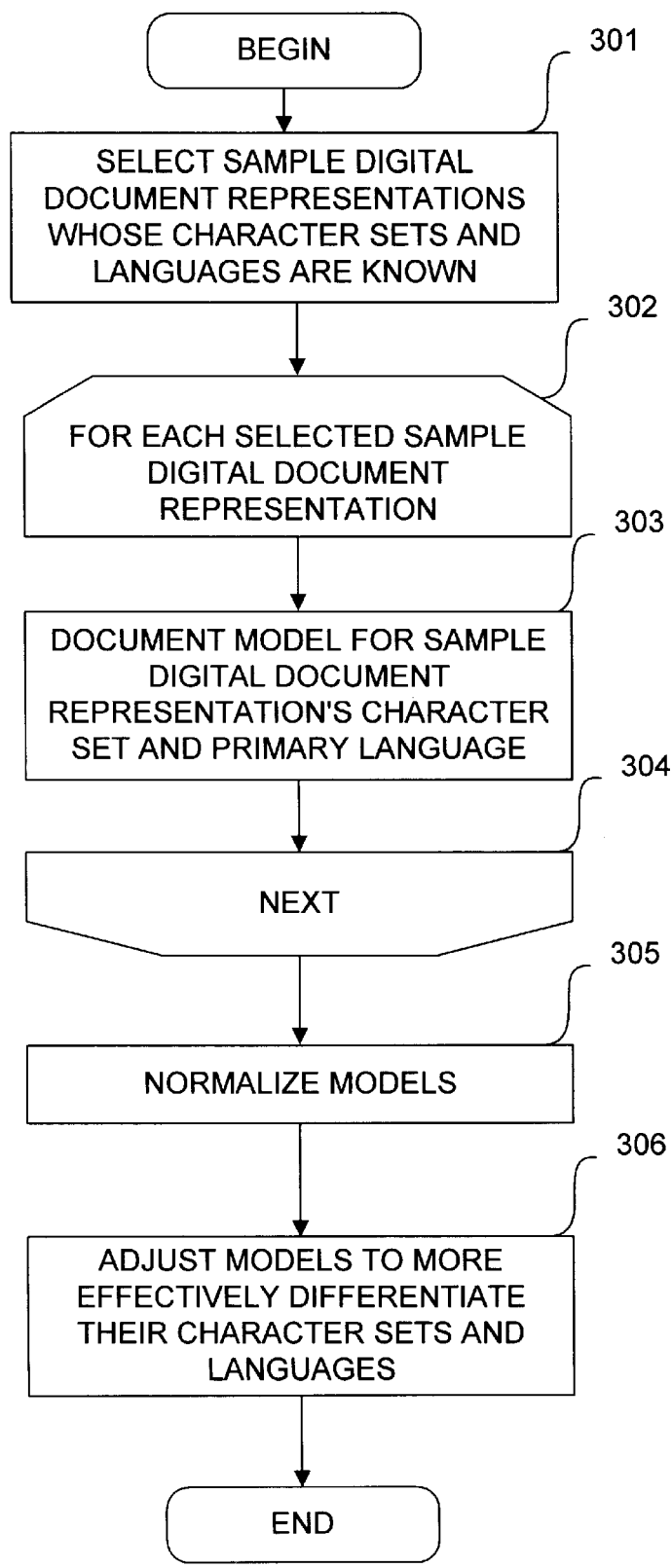
FIG. 3 is a flow diagram showing the steps preferably performed by the facility in the training phase.

FIG. 3 is a flow diagram showing the steps preferably performed by the facility in the training phase. In step 301, the facility selects sample digital document representations whose character sets and primary languages are known. As the number of sample digital document representations directly affects the statistical accuracy of the models generated by the facility and therefore the level of the facility's performance, a large number of sample digital document representations is preferably selected in step 301. In steps 302–304, the facility loops through each sample digital document representation selected in step 301. In step 303, the facility augments the model for the character set and primary language identified for the sample digital document representation. Step 303 is discussed in greater detail below in conjunction with FIG. 4. In step 304, if one or more selected sample digital document representations remain to be processed, the facility continues at step 302 to process the next selected sample digital document representation. If all of the selected sample digital representations have been processed, then the facility continues in step 305. In step 305, the facility normalizes the models generated as a result of augmentation in step 303. The normalization performed in step 305 preferably involves proportionally increasing or decreasing the counters of each model so that the average counter value in each model is the same. In step 306, the facility adjusts the normalized models to more effectively differentiate their character sets and languages, by, for each model, (a) increasing the counts for n-grams whose counts are the highest relative to the counts for the same n-gram in other models and (b) decreasing the counts for n-grams whose counts are high relative to the other counts for that model, but not high relative to the counts for the same n-gram in other models. In a preferred embodiment, this adjustment is accomplished by doubling each count of each model, then subtracting the average of the corresponding counts among all models. After step 306, these steps, and the training phase, conclude.

Figure 4:
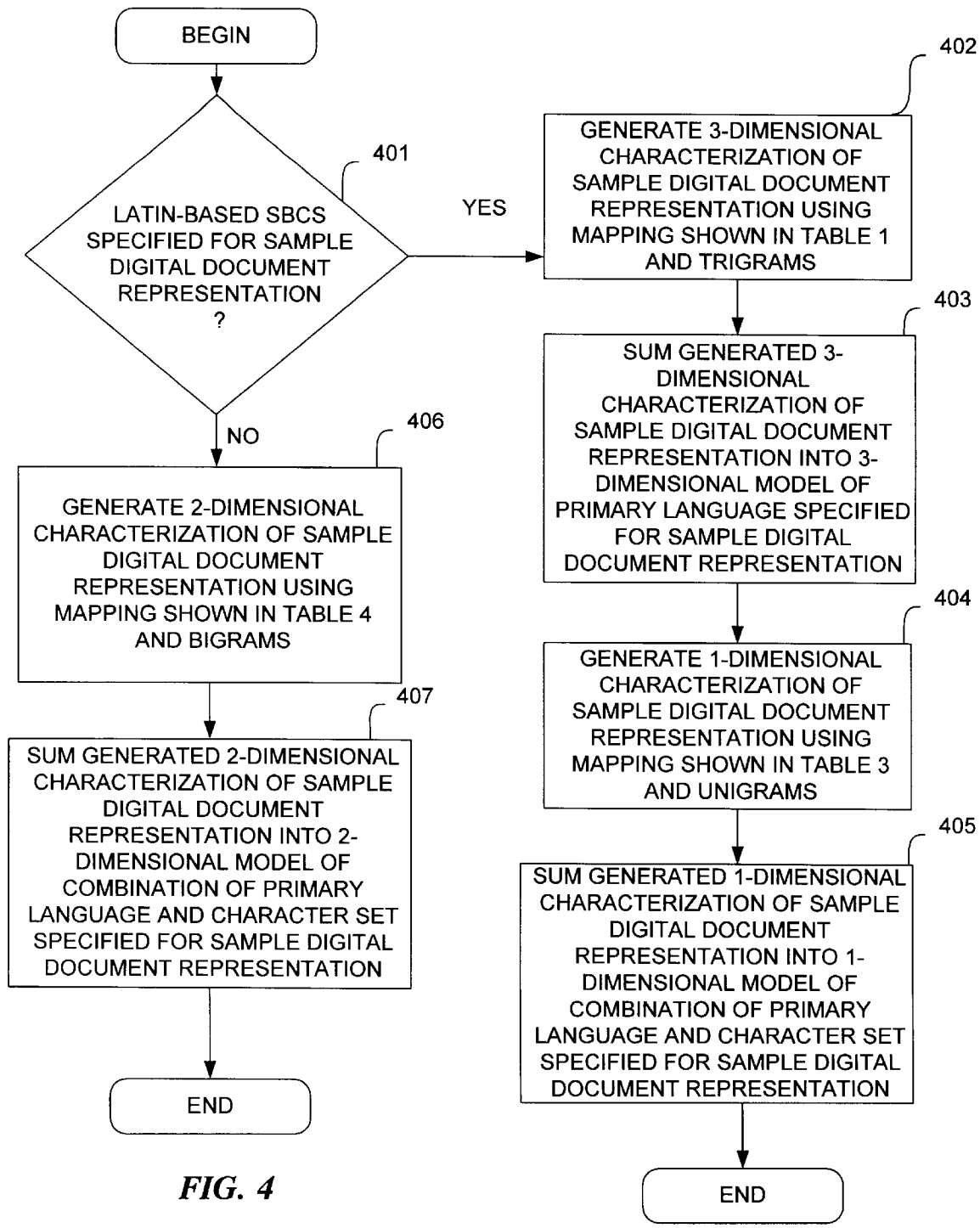
FIG. 4 is a flow diagram showing the steps preferably performed by the facility in order to augment the models for the character set and primary language identified for a particular sample digital document representation in accordance with step 304.

FIG. 4 is a flow diagram showing the steps preferably performed by the facility in order to augment the models for the character set and primary language identified for a particular sample digital document representation in accordance with step 304. The facility preferably utilizes different reductive mappings, and maintains frequency data for different size n-grams, depending upon the type of character set used to create the current sample digital document representation. In step 401, if the current sample digital document representation is a Latin-based single byte character set, then the facility continues at step 402 to perform steps 402–405, else the character set of the current sample digital document representation is either a multiple byte character set (in which each character is represented by two or more byte values) or a single byte character set for a non-Latin-based language and the facility continues in step 406 to perform steps 406 and 407. Examples of Latin-based single byte character sets include: Microsoft character sets 1250 and 28592 for Czech, Hungarian, and Polish; Microsoft character set 1252 for Danish, Dutch, English, Finnish, French, German, Italian, Norwegian, Portuguese, Spanish, and Swedish; Microsoft character set 28591 for Finnish, French, German, Norwegian, Portuguese, and Swedish; Microsoft character set 28592 for German, Hungarian, and Polish; and Microsoft character set 1257 for Lithuanian. Examples of multiple byte character sets or non-Latin-based single byte character sets include Microsoft character sets 936 and 950 for Chinese, Microsoft character sets 932 and 51932 for Japanese, Microsoft character set 949 for Korean, and character sets for Greek and Hebrew.

In steps 402–405, the facility augments both a three-dimensional model of the primary language of the sample digital document representation and a one-dimensional model of the combination of that primary language and the character set of the sample digital document representation with characterizations of the sample digital document representation. The three-dimensional model is used by the facility to detect input digital document representations having the same primary language as this sample digital document representation, while the one-dimensional model is used to detect input digital document representations having the same primary language and character set as this sample digital document representation. In step 402, the facility generates a three-dimensional characterization of the current sample digital document representation using the mapping shown below in Table 1 and frequency statistics for character trigrams occurring in the sample digital document representation.

TABLE 1

Mapping to Detect Language of Latin-Based SBCS

| source value(s) | target value |
|---|---|
| 0x00-0x40, 0x5B-0x60, 0x7B-0x7F | 0 |
| 0x80-0XFF | 1 |
| 0x41, 0x61 | 2 |
| 0x42, 0x62 | 3 |

TABLE 1-continued

Mapping to Detect Language of Latin-Based SBCS

| source value(s) | target value |
|---|---|
| 0x43, 0x63 | 4 |
| . | . |
| . | . |
| . | . |
| 0x5A, 0x7A | 27 |

The details of step 402 for generating a characterization of the sample digital document representation are discussed in greater detail below in conjunction with FIG. 5. As part of the generating process, the facility maps each byte value in the sample digital document representation to a target value using the mapping shown in Table 1. Based upon a determination that languages expressed in a Latin-based single byte character set can be most effectively differentiated based upon the identities, irrespective of case, of the letters occurring therein, the mapping shown in Table 1 maps the source values corresponding to each letter to a different target value. For example, the sources values 0x41 and 0x61, corresponding to the character glyphs "A" and "a", respectively, are both mapped to the target value 2, source value 0x42 and 0x62, representing the character glyphs "B" and "b", respectively, are mapped to the target value 3, and so forth. Besides the target values assigned to letters, the mapping in Table 1 defines only two further target values: the target value 1 for "extended character" source values having their high-order bit set, i.e., 0x80-0xFF; and the target value 0 for source values not having their high-order bit set and not representing letters—these source values generally correspond to numerals, punctuation characters and other symbols, and control characters. By mapping source values in this manner, the facility reduces 256 source values to only 28 target values, thereby reducing storage requirements for trigram frequency statistics by over 99%.

As an example, consider the following sample text string:

snow, called "POWDER."

Table 2 below shows, in its "byte value" column, the series of byte values that make up the sample string in a sample digital document representation. The "target value" column of Table 2 shows the series of target values to which the byte values are mapped using the mapping shown in Table 1.

TABLE 2

| character number | character glyph | byte value | target value |
|---|---|---|---|
| 1 | s | 0x73 | 20 |
| 2 | n | 0x6E | 15 |
| 3 | o | 0x6F | 16 |
| 4 | w | 0x77 | 24 |
| 5 | , | 0x2C | 0 |
| 6 |   | 0x20 | 0 |
| 7 | c | 0x63 | 4 |
| 8 | a | 0x61 | 2 |
| 9 | l | 0x6C | 13 |
| 10 | l | 0x6C | 13 |
| 11 | e | 0x65 | 6 |
| 12 | d | 0x64 | 5 |
| 13 |   | 0x20 | 0 |
| 14 | " | 0x22 | 0 |
| 15 | P | 0x50 | 17 |
| 16 | O | 0x4F | 16 |
| 17 | W | 0x57 | 24 |

TABLE 2-continued

| character number | character glyph | byte value | target value |
|---|---|---|---|
| 18 | D | 0x44 | 5 |
| 19 | E | 0x45 | 6 |
| 20 | R | 0x52 | 19 |
| 21 | . | 0x2E | 0 |
| 22 | " | 0x22 | 0 |

It can be seen from Table 2 that each distinct letter has its own target value. For example, the lowercase character "o" and the uppercase character "O" both map to target value 16. It can further be seen that all of the punctuation character glyphs, including the comma, space, quotation mark, and period, map to a single target value, target value 0. Thus, it is the identities of the distinct letters that are used to distinguish different languages in digital document representations expressed in Latin-based single byte character sets. The mapping shown in Table 1 may further be used to generate models and characterizations for character sets such as Microsoft character set 50220 for Japanese that, while technically double byte character sets, do not use byte values between 0x80 and 0xFF.

In step 403, the facility sums the three-dimensional characterization of the sample digital document representation generated in step 402 into a three-dimensional model of the language identified as the primary language of the sample digital document representation. This summing process involves adding the value of each entry in the three-dimensional characterization of the sample digital document representation into the corresponding entry in the three-dimensional model of the primary language. Steps 404 and 405 mirror steps 402 and 403, respectively, in that step 404 generates a characterization of the sample digital document representation and step 405 sums that characterization into a model of a language and character set. In step 404, the facility generates a one-dimensional characterization of the current sample digital document representation using the mapping shown below in Table 3 and frequency statistics for character unigrams occurring in the sample digital document representation.

TABLE 3

Mapping to Detect Character Set of Latin-Baseed SBCS

| source value(s) | target value |
|---|---|
| 0-0x7F | 0 |
| 0x80 | 1 |
| 0x81 | 2 |
| 0x82 | 3 |
| . | . |
| . | . |
| . | . |
| 0xFF | 128 |

It can be seen from Table 3 that the mapping for detecting the correct character set among the Latin-based single byte character sets maps each source value having its high-order bit set to a different target value. For example, the source value 0x80 is mapped to the target value 1, the source value 0x81 is mapped to the target value 2, and so forth. In single byte character sets, only these "extended character byte values" represent different characters in different character sets—on the other hand, each of the byte values 0–0x7F generally represent the same character in all of these character sets. It is therefore these extended character byte codes that serve to best differentiate between different Latin-based single byte character sets. In addition to the 128 target values that are each assigned to one of the source values between 0x80 and 0xFF, the mapping defines one further target value: the target value 0 is assigned to all of the source values between 0 and 0x7F. By mapping source values in this manner, the facility reduces 256 source values to only 129 target values, thereby reducing storage requirements for unigram frequency statistics by nearly 50%.

In step 405, the facility sums the one-dimensional characterization of the sample digital document representation generated in step 404 into a one-dimensional model of the combination of the primary language and character set of the sample digital document representation. After completing step 405, these steps conclude.

In steps 406–407, the facility generates a single characterization of the sample digital document representation and sums it into a single model for both the primary language and the character set of the sample digital document representation. In step 406, the facility generates a two-dimensional characterization of the sample digital document representation using the mapping shown below in Table 4 and frequency statistics for character bigrams occurring in the sample digital document representation.

TABLE 4

Mapping to Detect Language and Character Set of Non-Latin-Based SBCS or DBCS

| source value(s) | target value |
|---|---|
| 0x00-0x3F, 0x5B-0x60, 0x7B-0x7F | 0 |
| 0x41, 0x61 | 1 |
| 0x42, 0x62 | 2 |
| 0x43, 0x63 | 3 |
| . | . |
| . | . |
| . | . |
| 0x5A, 0x7A | 26 |
| 0x80 | 27 |
| 0x81 | 28 |
| 0x82 | 29 |
| . | . |
| . | . |
| 0xFF | 154 |

It can be seen that the mapping in Table 4 is essentially a union of the different target values defined by the two mappings shown in Table 1 and Table 3. This mapping reduces 256 source values to 155 target values, thereby reducing the storage requirements for bigram frequency statistics by over 63%.

In step 407, the facility sums the two-dimensional characterization of the sample digital document representation generated in step 406 into a two-dimensional model of the combination of the primary language and character set of the sample digital document representation. After step 407, these steps conclude.

Figure 5:
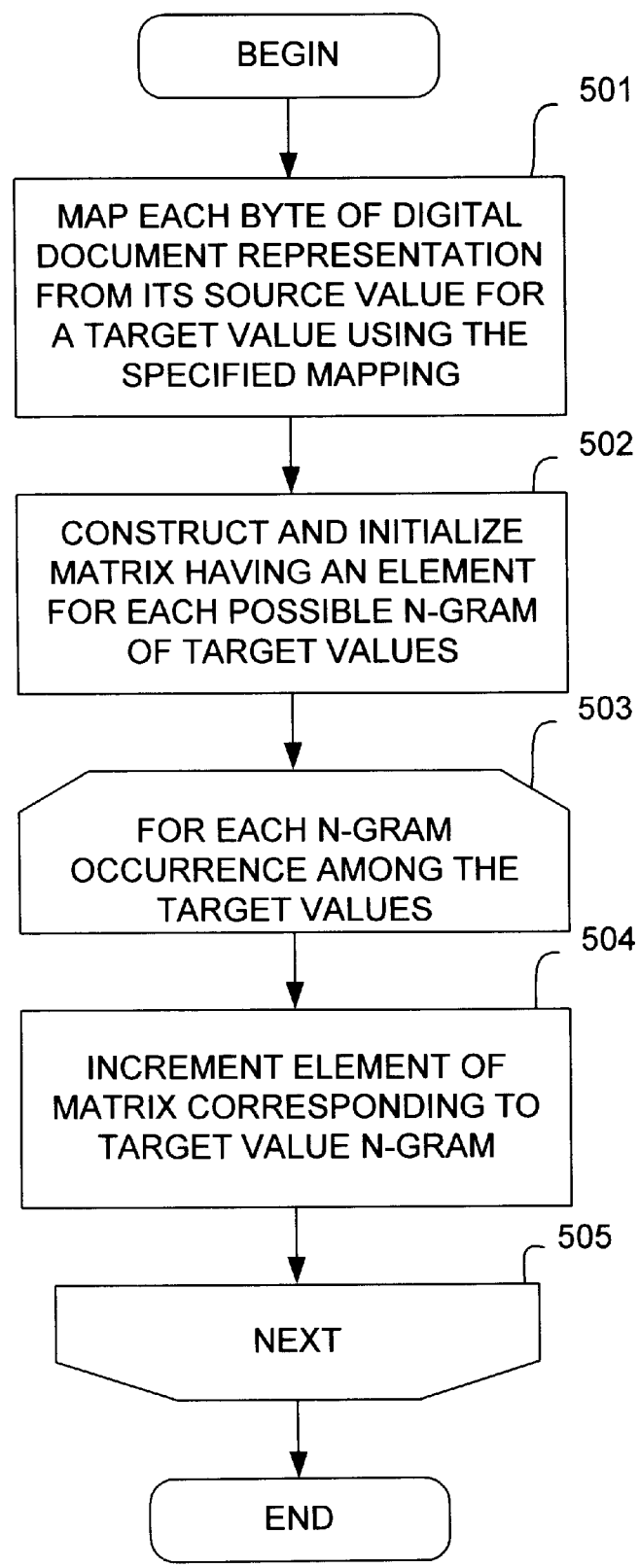
FIG. 5 is a flow diagram showing the steps preferably performed by the facility to generate a characterization of a sample digital document representation.

FIG. 5 is a flow diagram showing the steps preferably performed by the facility to generate a characterization of a sample digital document representation. The steps shown in FIG. 5 are preferably performed by the facility as part of steps 402, 404, and 406. As is shown in steps 402, 404, and 406, a characterization generated in accordance with the steps of FIG. 5 utilizes a particular reductive mapping and has a specified number of dimensions directly corresponding to the length of the n-grams for which frequency statistics are maintained in the characterization. For example, in accordance with step 406 for multiple-byte character sets and non-Latin-based single byte character sets, the facility uses the mapping shown in Table 3 and generates a two-dimensional characterization that contains the frequency of each possible bigram of target values.

In step 501, the facility uses the reductive mapping specified for the characterization to map each byte of the digital document representation from the source value for the byte to a target value. For example, for the characters shown in Table 2, the facility would map the byte or source values to the target values shown in Table 2. In step 502, the facility constructs and initializes a matrix to contain the characterization. The matrix has a number of dimensions corresponding directly to the length, in characters, specified for n-grams for this combination of language and character set. For example, because step 406 specifies the use of bigram frequency statistics, the facility constructs a two-dimensional matrix when performing step 502. In each of its dimensions, the matrix preferably has one position for each possible target value in the reductive mapping.

In steps 503–505, the facility loops through each n-gram occurrence of the specified length among the series of target values created in step 501. That is, where bigram frequency statistics are specified, the facility begins by considering the first and second target values in the series, then considers the second and third target values in the series, and so on until it considers the second-to-last and last target values in the series of target values. In step 504, for the current n-gram occurrence, the facility increments the element of the matrix constructed in step 502 that corresponds to the target value n-gram currently being considered. That is, the matrix element that is incremented is the one whose first index has the first target value of the n-gram, whose second index has the second target value of the n-gram, and so on. For example, when collecting the trigram frequencies for the first trigram shown in Table 2 having target values 20, 15, and 16, the facility would increment the value of the matrix at (20, 15, 16). In step 505, if any target value n-gram occurrences remain, then the facility continues at step 503 to consider the next one. Otherwise, these steps conclude. At the conclusion of these steps, the matrix constructed in step 502 reflects the number of occurrences of each target value n-gram in the digital document representation.

Figure 6:
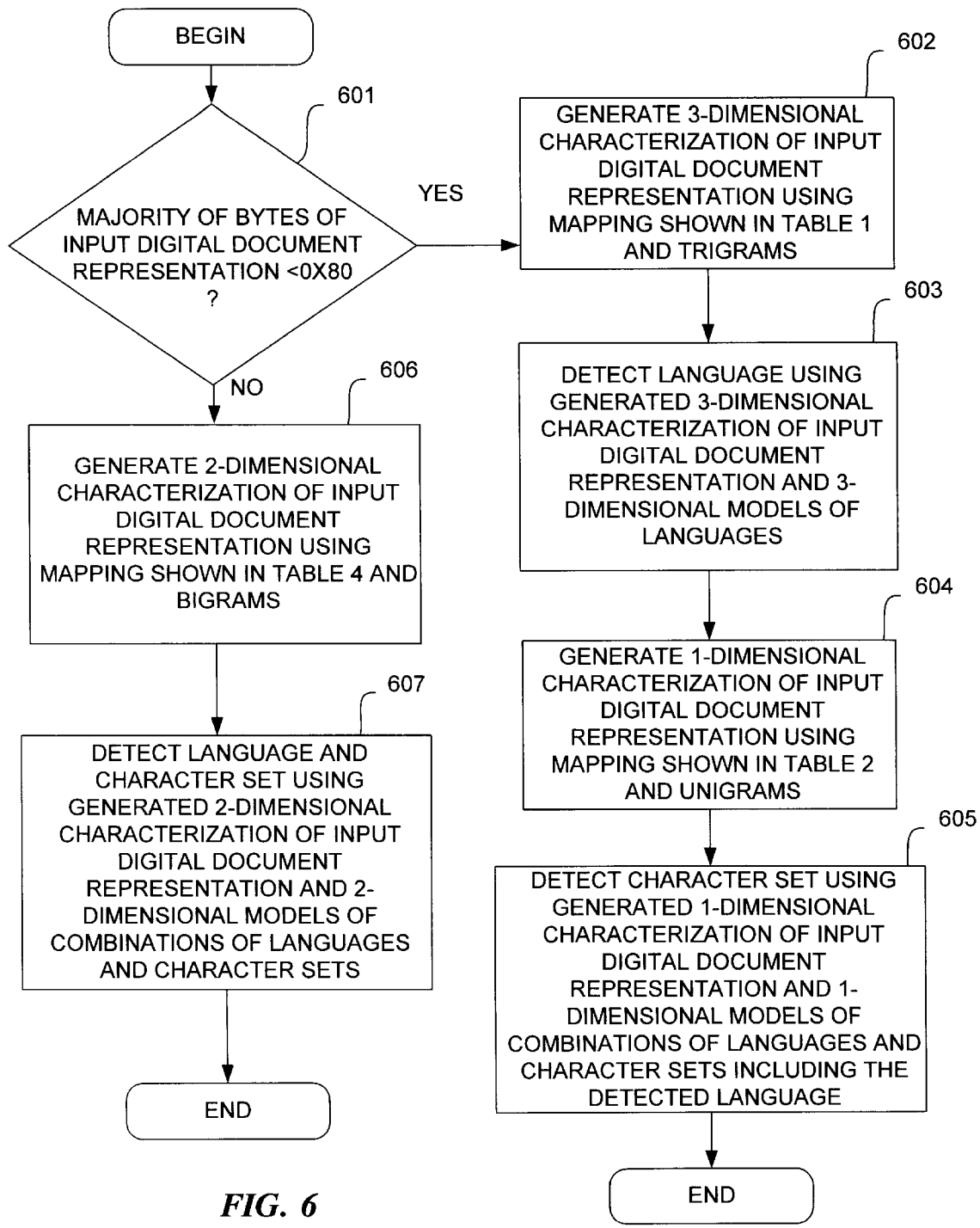
FIG. 6 is a flow diagram showing the steps preferably performed by the facility in order to identify the character set and language of an input digital document representation for which this information is not known.

FIG. 6 is a flow diagram showing the steps preferably performed by the facility in order to identify the character set and language of an input digital document representation for which this information is not known. In step 601, the facility determines whether the input digital document representation is likely expressed in a Latin-based single byte character set. If the majority of bytes of the input digital document representation before mapping have a value smaller than 0x80, i.e., do not have their high-order bit set, then the facility determines that the input digital document representation is expressed in a Latin-based single byte character set and the facility continues in step 602 to perform steps 602–605, else the facility determines that the input digital document representation is expressed in a multiple byte character set or a non-Latin-based character set and continues in step 606 to perform steps 606 and 607.

In step 602, in a manner similar to that of step 402, the facility generates a three-dimensional characterization of the input digital document representation using the mapping shown in Table 1 and trigrams. In step 603, the facility detects the language of the input digital document representation using the three-dimensional characterization of the input digital document representation generated in step 602 and the three-dimensional models of languages generated in step 201 of the training phase. This detection process is discussed in greater detail below in conjunction with FIG. 7. In step 604, after detecting the language of the input digital document representation, the facility generates a one-dimensional characterization of the input digital document representation in a manner similar to that of step 404 using the mapping shown in Table 3 and unigrams. In step 605, the facility detects the character set of the input digital document representation using the one-dimensional characterization of the input digital document representation generated in step 604 and the one-dimensional models of combinations of languages and character sets that include the detected language. This detection process is discussed in greater detail below in conjunction with FIG. 7. After step 605, these steps conclude.

In step 606, in a manner similar to that of step 406, the facility generates a two-dimensional characterization of the input digital document representation using the mapping shown in Table 4 and bigrams. In step 607, the facility detects both the language and the character set of the input digital document representation using the two-dimensional characterization of the input digital document representation generated in step 606 and the two-dimensional models of combinations of languages and character sets generated in step 201 of the training phase. Again, this detection process is described in greater detail below in connection with FIG. 7. After step 607, these steps conclude.

Figure 7:
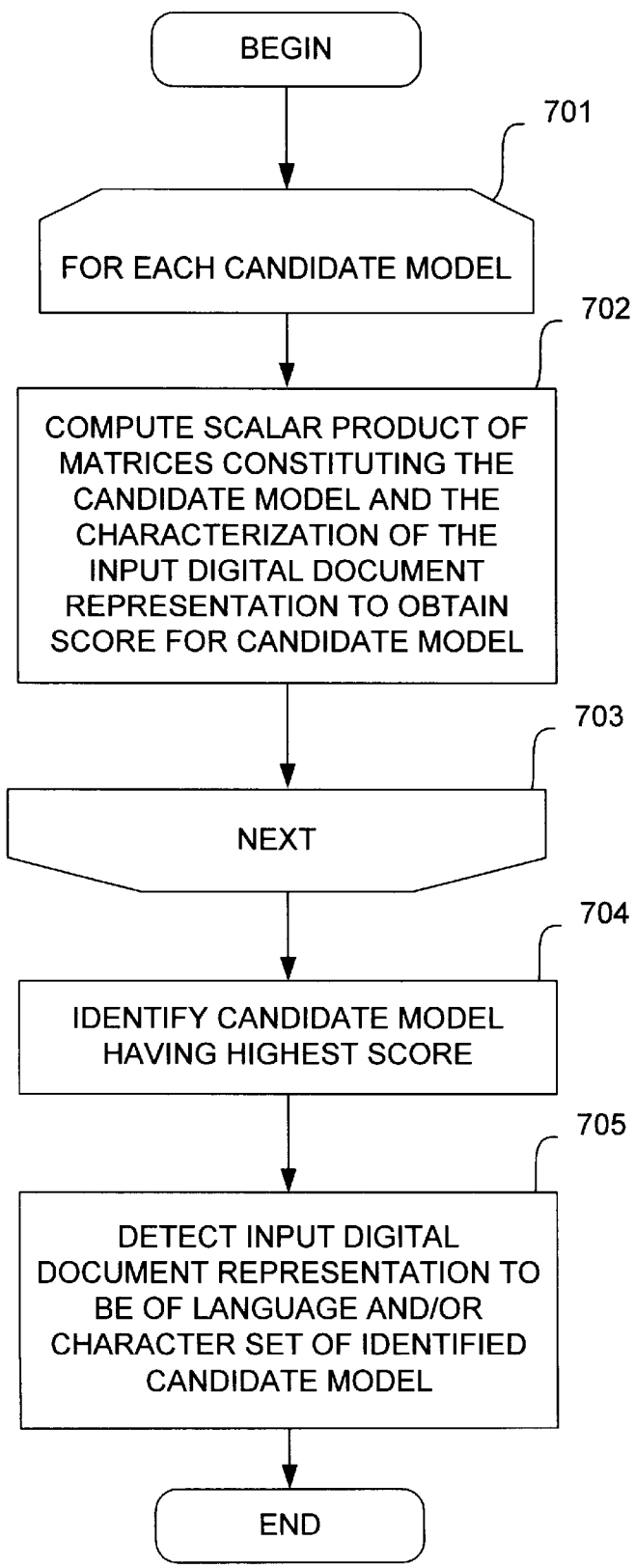
FIG. 7 is a flow diagram showing the steps preferably performed by the facility in order to detect the character set and/or language of the input digital document representation.

FIG. 7 is a flow diagram showing the steps preferably performed by the facility in order to detect the character set and/or language of the input digital document representation in accordance with step 603, 605, or 607. In these steps, the facility compares the present characterization of the input digital document representation to each candidate model. The language and/or character set of the candidate model that is most similar to the characterization of the input digital document representation is detected for the input digital document representation. In steps 701–703, the facility loops through each candidate model of a language and/or character set as specified in steps 603, 605, or 607. In step 702, the facility computes the scalar product of the matrices that constitute the current candidate model and the characterization of the input digital document representation. Such computation involves multiplying the value at each location in the candidate model matrix with the corresponding value in the characterization matrix, and summing these products to obtain a single value, called a "score," that represents the similarity of the candidate model to the characterization. In step 703, if additional candidate models remain to be processed, then the facility continues in step 701 to process the next candidate model, else the facility continues in step 704. In step 704, the facility identifies the candidate model for which the highest score was computed in step 702. In step 705, the facility detects the input digital document representation to be of the language and/or character set of the candidate model identified in step 704. After step 705, these steps conclude.

Figure 8:
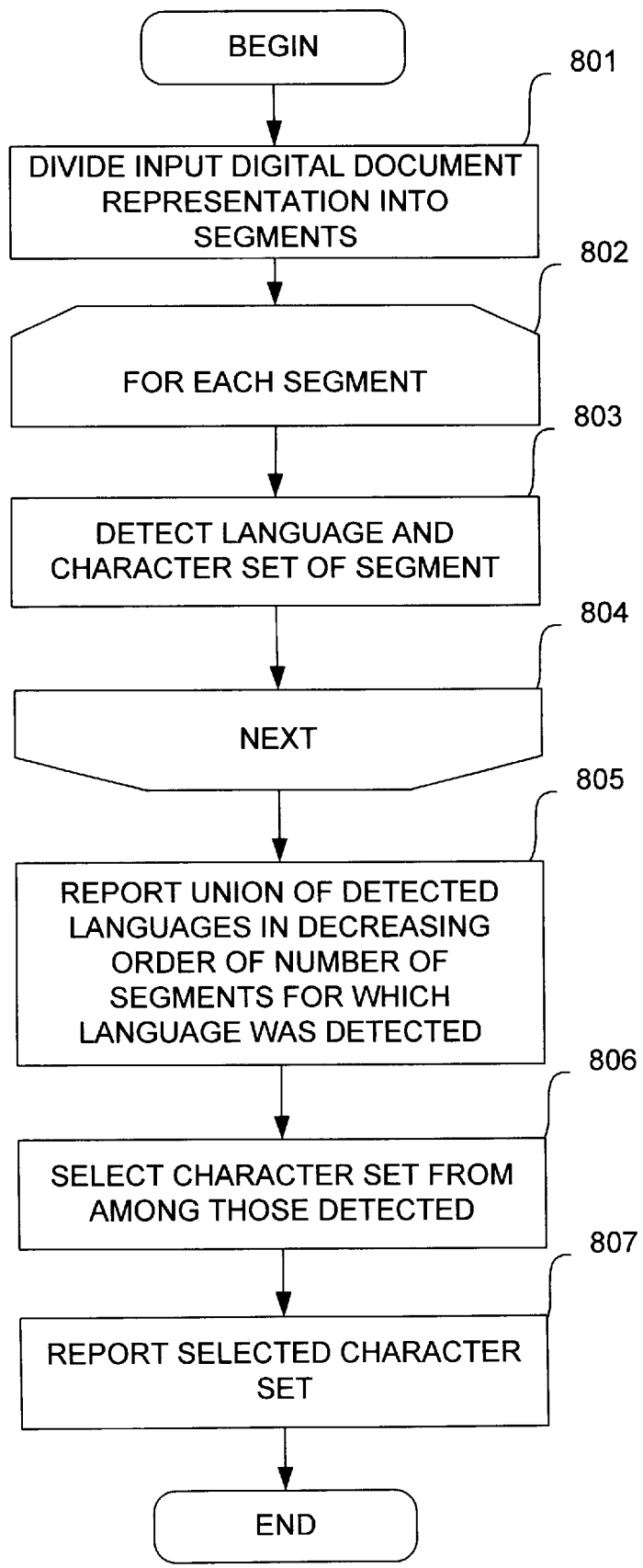
FIG. 8 is a flow diagram showing the steps preferably performed by the facility in order to detect multiple languages, as well as the character set, of an input digital document representation.

The steps shown in FIG. 6, because they assess the input digital document representation as a whole, detect a single dominant language for the input digital document representation. For input digital document representations containing text in more than one language, however, detecting each of these languages often has significant utility. FIG. 8 is a flow diagram showing the steps preferably performed by the facility in order to detect multiple languages occurring in an input digital document representation, as well as the character set in which the input digital document representation is expressed. These steps involve dividing the input digital document representation into a number of shorter segments, detecting the language and character set of each segment, and reporting the union of the languages detected for the segments as well as a detected character set.

In step 801, the facility divides the input digital document representation into segments. In a first embodiment, these segments are the size of a typical sentence, or about 75 characters. In an alternative embodiment, the segments are the size of a typical paragraph, or about 400 characters. This segment size is preferably configurable, allowing the facility to be adapted to detecting text of different languages in chunks of various sizes. Decreasing segment size increases the number of languages that may be detected in a multi-lingual input digital document representation, while increasing segment size reduces processing time in the detection phase.

In steps 802–804, the facility loops through each segment. In step 803, the facility detects the language and character set of the current segment in accordance with the steps shown in FIG. 6. In step 804, if additional segments remain to be processed, then the facility continues in step 802 to process them, else the facility continues in step 805. In step 805, the facility reports that the input digital document representation contains each language that was detected in an iteration of step 803 for one of the segments, in the decreasing order of the number of segments for which the language was detected. In one embodiment, the detected languages reported in step 805 are limited to those that were detected in a threshold number of segments larger than 1. In a further preferred embodiment, the reported union of detected languages is further sorted to promote double byte character set languages or non-Latin-based languages above Latin-based single byte character set languages in the list.

In step 806, the facility selects a character set from among the character sets detected in iterations of step 803. Step 806 is described in further detail below in conjunction with FIG. 9. In step 807, the facility reports the character set selected in step 806. After step 807, these steps conclude.

Figure 9:
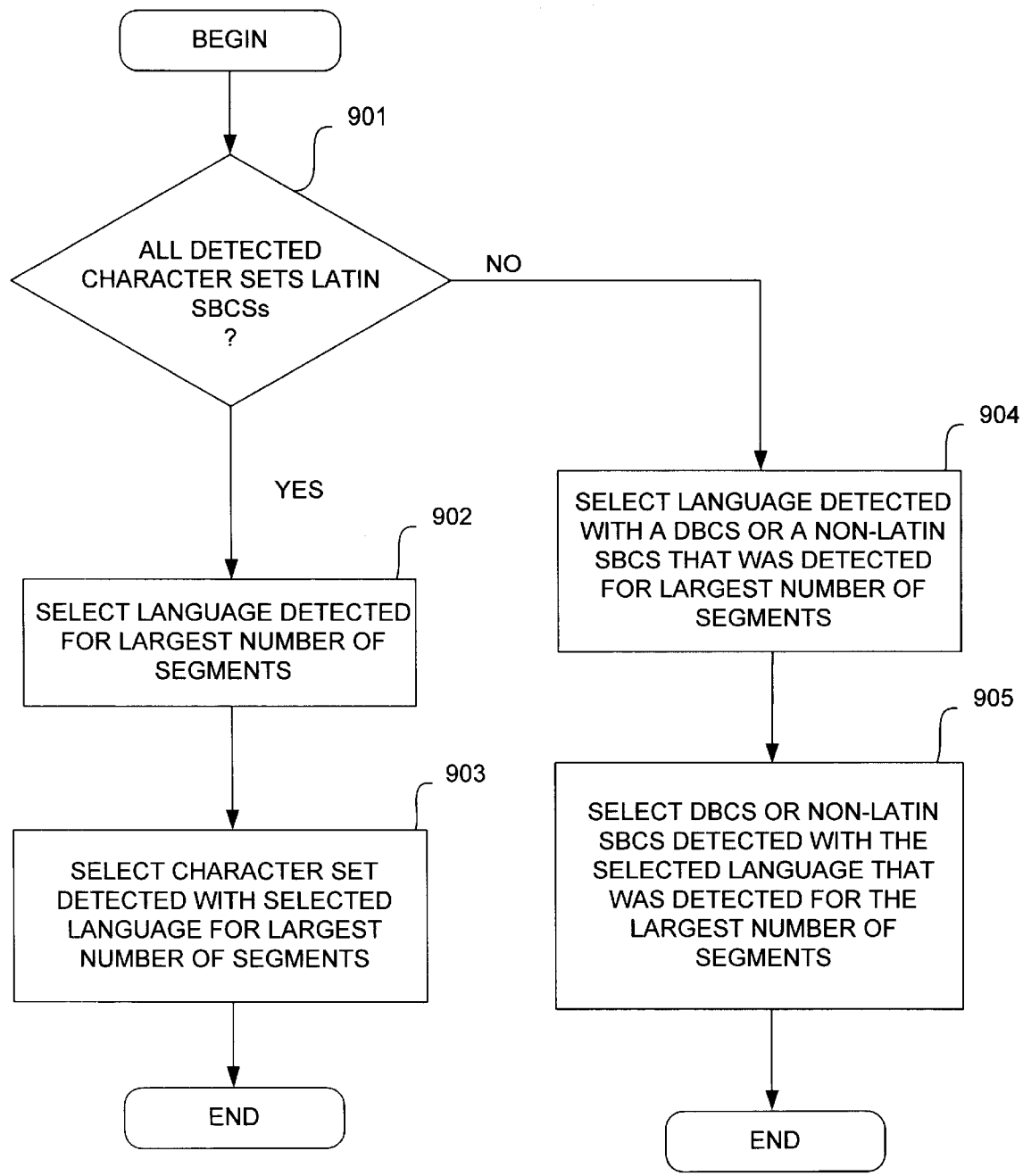
FIG. 9 is a flow diagram showing the steps preferably performed by the facility in order to select a character set for the input digital document representation from among those character sets detected for segments of the input digital document representation.

FIG. 9 is a flow diagram showing the steps preferably performed by the facility in order to select a character set for the input digital document representation from among those character sets detected for segments of the input digital document representation. In step 901, if all of the detected character sets are Latin-based single byte character sets, then the facility continues in step 902, else the facility continues in step 904. In step 902, the facility selects the language detected for the largest number of segments as the language of the input digital document representation. In step 903, the facility selects the character set detected along with the language selected in step 902 in the largest number of segments. After step 903, these steps conclude. In step 904, the facility selects the language that was detected with a multiple byte character set or a non-Latin-based single byte character set that was detected in the largest number of segments. In step 905, the facility selects the multiple byte character set or a non-Latin-based single byte character set detected with the language selected in step 904 that was detected for the largest number of segments. After step 905, these steps conclude.

The foregoing discusses the use of the facility to detect both the character set and languages of an input digital document representation in which this information is unknown. The facility is further capable of detecting the languages used in an input digital document representation known to be expressed in the special Unicode character set. The Unicode character set, as defined by the Unicode Consortium of San Jose, Calif. in The Unicode Standard, Version 2.0, is a large character set designed to represent most of the character glyphs used in a large number of the world's languages. Because the Unicode character set can represent the text of so many different languages, it is useful to be able to detect the languages present in an input digital document representation known to be expressed in the Unicode character set. The Unicode character set utilizes 16-bit character values, allowing for 65,536 different characters. The Unicode character set is partitioned into a number of "script ranges" that group together the characters generally used in one language or in a group of related languages. Table 5 below shows some of the "single-language" script ranges containing characters that are used in only one language.

TABLE 5

Single-Language Unicode Script Ranges

| source values | significance | language |
| --- | --- | --- |
| 0x0600-0x6FF | Arabic | Arabic |
| 0xfB50-0xFDFF | Arabic Presentation Forms-A | |
| 0xFE70-0xFEFE | Arabic Presentation Forms-B | |
| 0x3100-0x312F | Bopomofo | Chinese |
| 0x0370-0x03FF | Greek | Greek |
| 0x1F00-0x1FFF | Greek Extended | |
| 0x0590-0x05FF | Hebrew | Hebrew |
| 0x0900-0x097F | Devanagari | Hindi |
| 0x3040-0x309F | Hiragana | Japanese |
| 0x30A0-0x30FF | Katakana | |
| 0xFF60-0xFFDF | Halfwidth and Fullwidth Forms | |
| 0x1100-0x11FF | Hangul Jamo | Korean |
| 0x3130-0x318F | Hangul Compatibility Jamo | |
| 0xAC00-0xD7A3 | Hangul Syllables | |
| 0x0400-0x04FF | Cyrillic | Russian |
| 0x0E00-0x0E7F | Thai | Thai |

It can be seen from Table 5, for example, that the script range from 0x0400 to 0x04FF is used only in Russian. Table 6 below, on the other hand, shows some of the "multiple-language" script ranges containing characters that are each used in a group of two or more languages.

TABLE 6

Multiple-Language Unicode Script Ranges

| source values | significance | language group |
| --- | --- | --- |
| 0x0041-0x005A | Basic Latin A-Z | Latin |
| 0x0061-0x007A | Basic Latin a-z | |
| 0x00C0-0x017F | Latin-1 Supplement and Extended-A | |
| 0x1E00-0x1EFF | Latin Extended Additional | |
| 0xFF21-0xFF3A | Fullwidth ASCII A-Z | |
| 0xFF41-0xFF5A | Fullwidth ASCII a-z | |
| 0x3000-0x303F | CJK Symbols and Punctuation | CJK |
| 0x3190-0x319F | Kanbun | |
| 0x3200-0x32FF | Enclosed CJK Letters and Months | |
| 0x3300-0x33FF | CJK Compatibilty | |
| 0x4E00-0x9FFF | CJK Unified Ideographs | |
| 0xF900-0xFAFF | CJK Compatibility Ideographs | |
| 0xFE30-0xFE4F | CJK Compatibility Forms | |

It can be seen, for example, that the script range from 0x4E00 to 0x9FFF is used in each of the "CJK group" of languages, Chinese, Japanese, and Korean. Where the characters in a segment of a Unicode input digital document representation are predominantly within one of the single-language script ranges, the facility detects the language of the segment to be the single language of that script range. On the other hand, where the characters of a segment are predominantly within a multiple-language script range, the facility preferably maps the source values of the segment to generate a statistical characterization of the segment, then compares that characterization to models of the languages in the language group in a manner discussed above.

For segments that are predominantly composed of characters in one or more script ranges of the "Latin" language group which contains the Latin-based languages such as those listed above, the facility preferably utilizes the mapping shown below in Table 7 to map the source values of the segment to the same 28 target values as the mapping shown in Table 1 for detecting the language of a Latin-based single byte character set.

TABLE 7

Mapping to Detect Language of Latin-Based Unicode

| source value(s) | target value |
|---|---|
| 0x0000-0x0040, 0x005B-0x0060, 0x007B-0x00BF, 0x0180-0x1DFF, 0x1F00-0xFF20, 0xFF3B-0xFF40, 0xFF5B-0xFFFF | 0 |
| 0x00C0-0x017F, 0x1E00-0x1EFF | 1 |
| 0x0041, 0x0061, 0xFF21, 0xFF41 | 2 |
| 0x0042, 0x0062, 0xFF22, 0xFF42 | 3 |
| 0x0043, 0x0063, 0xFF23, 0xFF43 | 4 |
| . | . |
| . | . |
| . | . |
| 0x005A, 0x007A, 0xFF3A, 0xFF5A | 27 |

As is discussed in more detail below, the facility detects the Latin-based language within the Latin group by comparing a three-dimensional characterization of the segment using this mapping to the three-dimensional models of languages in the Latin group already generated by the facility in accordance with FIG. 3.

For segments predominantly composed of character values in a multiple-language script range for a language group other than the Latin language group, the facility uses a custom mapping generated by the facility specifically for that language group in a manner designed to distinguish between the different languages of the language group. These custom mappings, like the mapping shown in Table 7, map from all of the 65,536 Unicode character values to a much smaller number of target values, such as 256. The custom mapping for the language group is used to construct a one-dimensional characterization of the segment, which is then compared to one-dimensional models of the different languages in the language group generated using the same custom mapping.

Figure 10:
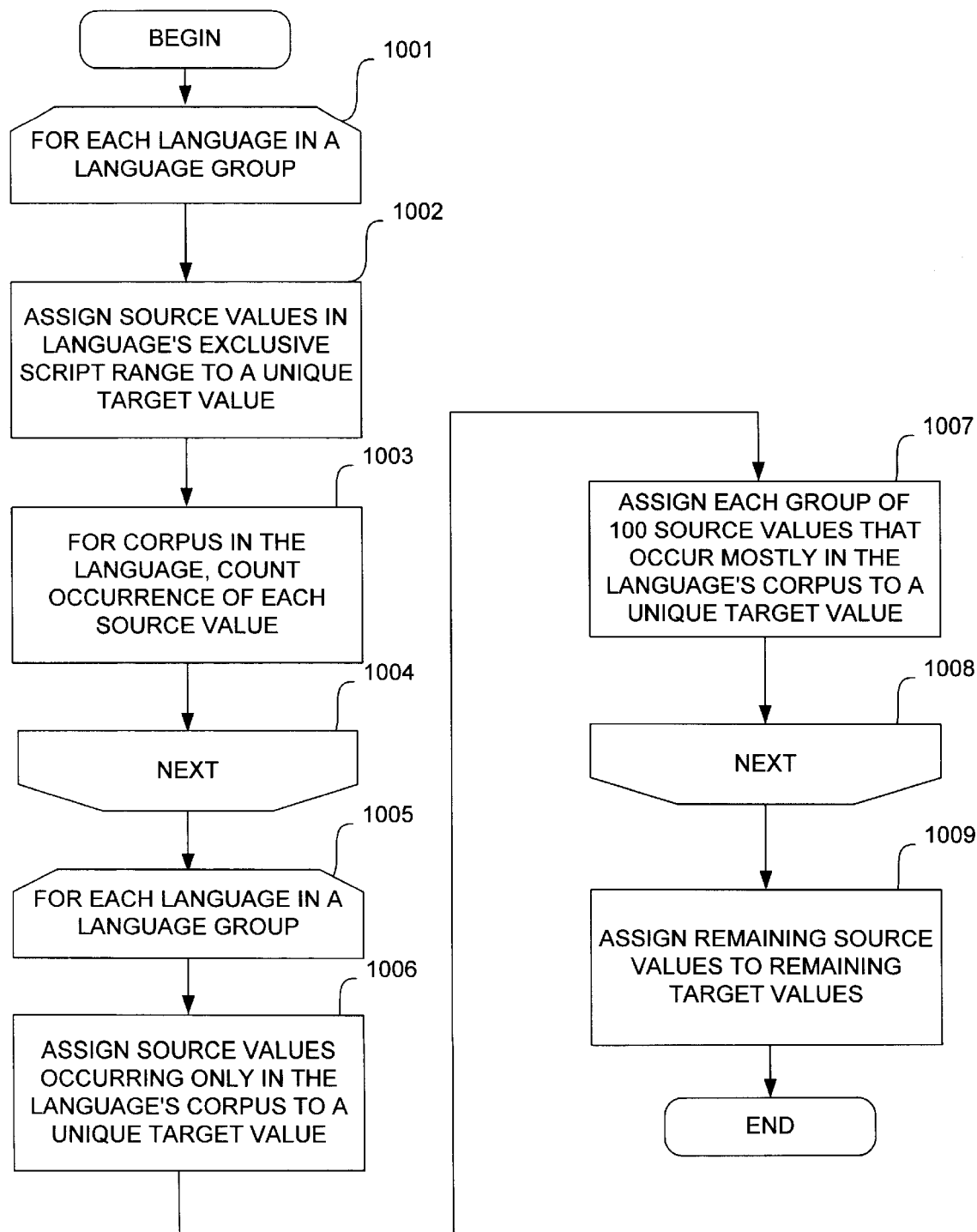
FIG. 10 is a flow diagram showing the steps preferably performed by the facility in the training phase in order to generate a custom reductive mapping for a Unicode language group used to differentiate between languages of the language group.

FIG. 10 is a flow diagram showing the steps preferably performed by the facility in the training phase in order to generate a custom reductive mapping for a Unicode language group used to differentiate between the languages of the language group. These steps are preferably performed for each group of languages that rely heavily on the same script range. For example, the Chinese, Japanese, and Korean languages all rely heavily on the script ranges shown for the "CJK" language group in Table 6. As a further example, a group of Indian languages also rely heavily on a single script range. These steps are performed once for each such group, generating a custom mapping for the group designed to distinguish the languages of the group. In a preferred embodiment, the custom mapping has 256 target values. In alternative embodiments, the custom mapping maps to a number of target values larger or smaller than 256.

In steps 1001–1004, the facility loops through each language in the language group. In step 1002, the facility assigns any source values in the current language's exclusive script range to a unique target value. In step 1003, the facility counts the number of occurrence of each distinct source value. In step 1004, if additional languages remain to be processed, then the facility continues in step 1001 to process the next language in the language group, else the facility continues in step 1005. In steps 1005–1008, the facility again loops through each language in the language group. In step 1006, the facility assigns the source values occurring only in the corpus of the current language to a unique target value. In step 1007, the facility assigns each group of 100 source values that occur mostly in the corpus of the current language to a unique target value. In step 1008, if additional languages remain to be processed, then the facility continues in step 1005 to process the next language in the language group, else the facility continues in step 1009. In step 1009, the facility assigns the remaining source values to the remaining target values. After step 1009, the custom mapping maps each source value to one of the 256 target values and these steps conclude.

After generating custom reductive mappings for each Unicode language group in accordance with FIG. 10, the facility preferably uses each custom mapping to generate a one-dimensional statistical model of each of the languages in the language group. The facility performs such generation in accordance with the steps shown in FIG. 3.

Figure 11:
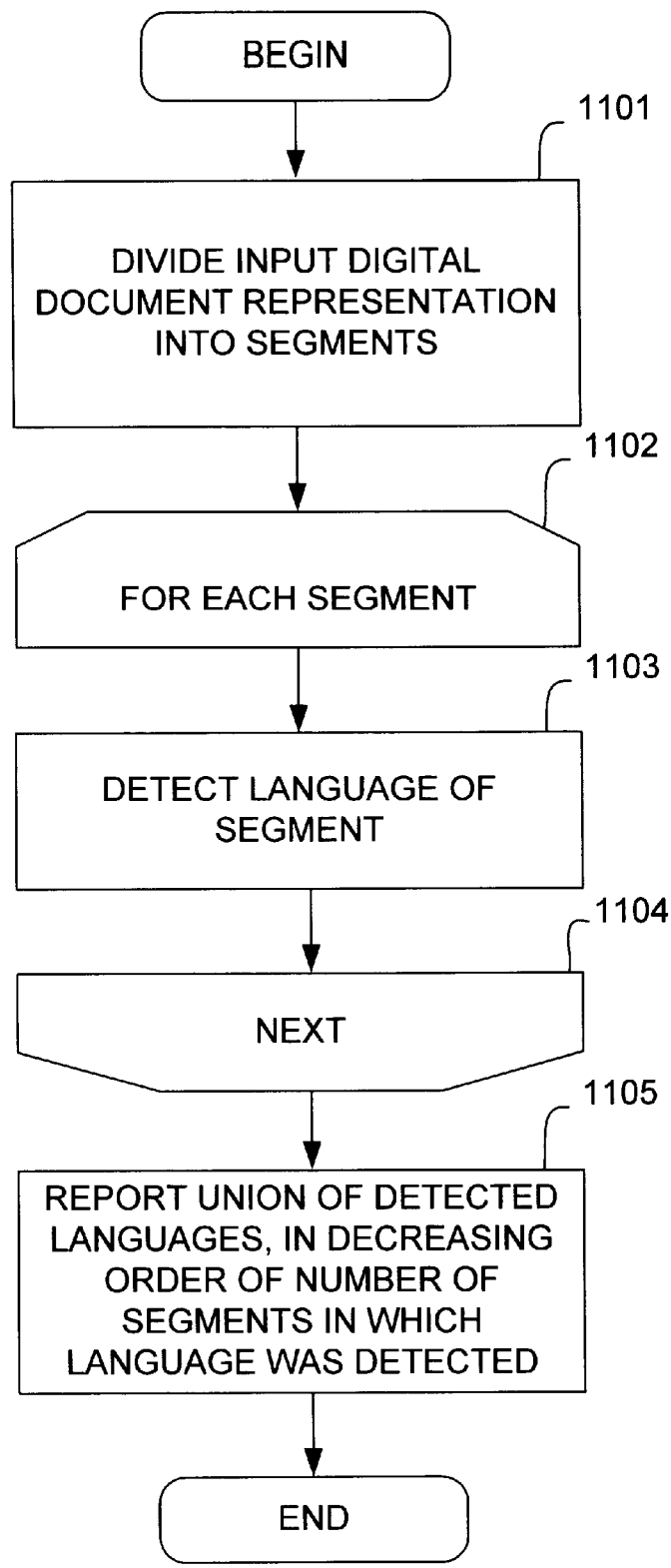
FIG. 11 is a flow diagram showing the steps preferably performed by the facility in order to detect the languages occurring in an input digital document representation expressed in the Unicode character set.

FIG. 11 is a flow diagram showing the steps preferably performed by the facility in order to detect the languages occurring in an input digital document representation expressed in the Unicode character set. In step 1101, the facility divides the input digital document representation into segments, such as paragraph-length segments having about 400 characters. In steps 1102–1104, the facility loops through each segment. In step 1103, the facility detects the language of the segment. This detection process is discussed further below in conjunction with FIG. 12. In step 1104, if additional segments remain to be processed, then the facility continues in step 1102 to process the next segment, else the facility continues in step 1105. In step 1005, the facility reports the union of the languages detected in step 1103, in decreasing order of the number of segments in which the language was detected. After step 1105, these steps conclude.

Figure 12:
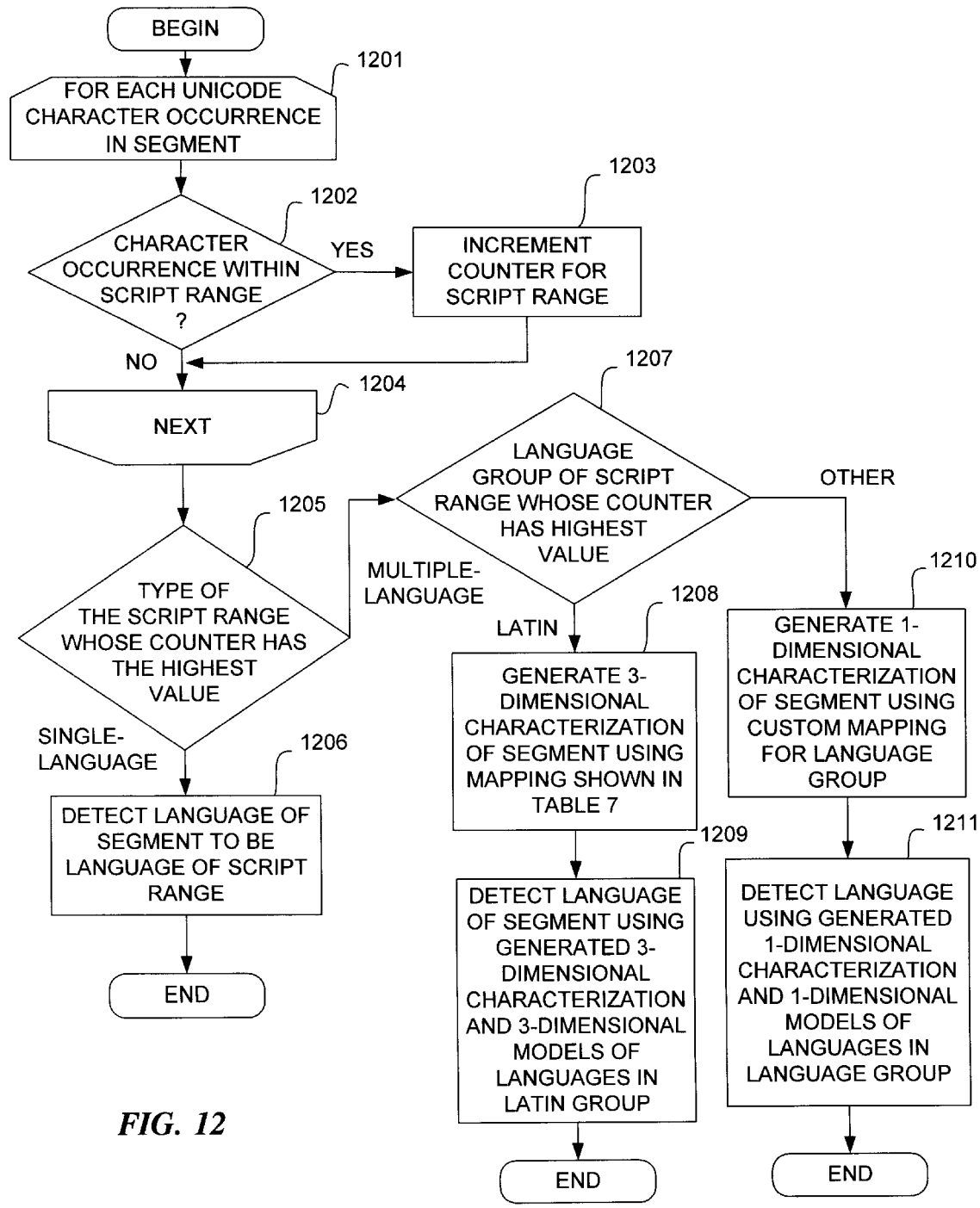
FIG. 12 is a flow diagram showing the steps preferably performed by the facility in order to detect the language of a segment of an input digital document representation expressed in the Unicode character set.

FIG. 12 is a flow diagram showing the steps preferably performed by the facility in order to detect the language of a segment of an input digital document representation expressed in the Unicode character set. In steps 1201–1204, the facility counts the number of Unicode character occurrences in the segment that are within each script range shown in Tables 5 and 6. In steps 1201–1204, the facility loops through each Unicode character occurrence in the segment. In step 1202, if the character occurrence is within a script range, then the facility continues in step 1203 to increment a counter for the script range, else the facility continues in step 1204. In step 1204, if Unicode character occurrences remain to be processed, then the facility continues in step 1201 to process the next Unicode character occurrence in the segment, else the facility continues in step 1205. In step 1205, if the script range whose counter has the highest value is a single-language script range, then the facility continues in step 1206, else the script range whose counter has the highest value is a multiple-language script range and the facility continues in step 1207. In step 1206, the facility detects the language of the segment to be the language of the single-language script range. After step 1206, these steps conclude.

In step 1207, if the language group of the script range whose counter has the highest value is the Latin language group, then the facility continues in step 1208, else the facility continues in step 1210. In step 1208, the facility generates a three-dimensional characterization of the segment using the mapping shown in Table 7 designed to distinguish the languages of the Latin language group. Step 1208 is performed in accordance with the steps shown in FIG. 5, discussed above. In step 1209, the facility detects the language of the segment using the generated three-dimensional characterization and three-dimensional models of the languages in the Latin group in accordance with the steps shown in FIG. 7. After step 1209, these steps conclude.

In step 1210, the facility generates a one-dimensional characterization of the segment using a custom mapping for the language group generated during the training phase in accordance with FIG. 10. Step 1210 is performed in accordance with the steps shown in FIG. 5, discussed above. In step 1211, the facility detects the language of the segment using the one-dimensional characterization generated in step 1210 and one-dimensional models of the languages in the language group in accordance with the steps shown in FIG. 7. After step 1211, these steps conclude.

While this invention has been shown and described with reference to preferred embodiments, it will be understood by those skilled in the art that various changes or modifications in form and detail may be made without departing from the scope of the invention. For example, n-grams of longer lengths than discussed above may be used to increase the accuracy of the facility. On the other hand, n-grams of shorter lengths may be used in order to reduce the storage requirements of the facility. Further, while statistical characterizations of digital document representations and statistical models of languages and/or character sets are preferably represented straightforwardly in the facility by utilizing single- or multi-dimensional arrays of values that are between 0 and 255, the facility may be straightforwardly adapted to use other storage schemes, such as arrays having elements of a different size, sparse arrays, or data structures of other types. Additionally, while the facility is described herein with respect to particular written natural languages and character sets, the facility may be straightforwardly applied to model and detect languages and character sets of all types, including those not presently in use.

I claim:

1. For a text string of data values representing text in an unknown distinguished language in accordance with an unknown distinguished character set that associates character glyphs with particular data values of a range, a method in a computer system for identifying the distinguished language of the text using the text string of data values, the method comprising the steps of:

applying a plurality-to-one reductive mapping of the text string of data values to generate a plurality-to-one reductively mapped transformed string of data values characterizing the text string of data values, wherein data values of the plurality-to-one reductively mapped transformed string of data values characterizing the text string of data values have a range smaller than the range of data values in the text string representing text in the unknown distinguished language;

generating a statistical analysis of the plurality-to-one reductively mapped transformed string of data values characterizing the text of data values;

for each of a plurality of languages:

retrieving a plurality-to-one reductively mapped statistical model that models the language in terms of the statistical occurrence of particular data values in plurality-to-one reductively mapped representative samples of text in the language, and comparing the retrieved plurality-to-one reductively mapped statistical model to the statistical analysis of the plurality-to-one reductively mapped transformed string of data values characterized the text string of data values; and identifying as the distinguished language the language among the plurality of whose model representing the language via the plurality-to-one reductive mapping compares most favorably to the statistical analysis of the plurality-to-one reductively mapped transformed string of data values characterizing the text string of data values.

2. A computer-readable medium comprising computer-executable instructions for performing the method recited in claim 1.

3. The method of claim 1 wherein each data value of the text string is two bytes.

4. The method of claim 1 wherein the plurality-to-one reductive mapping maps extended characters to a single value.

5. The method of claim 1 wherein the plurality-to-one reductive mapping maps one byte characters to differentiate only one byte characters representing different letters of the English alphabet, irrespective of case.

6. The method of claim 1 wherein the plurality-to-one reductive mapping maps numerals and punctuation to a single value.

7. The method of claim 1 wherein the plurality-to-one reductive mapping maps upper and lower case characters to a set of twenty-six values, one value for each different respective character in the English alphabet.

8. The method of claim 1 wherein the plurality-to-one reductive mapping comprises:

mapping upper and lower case letters of the English alphabet to a set of twenty-six different values;

mapping extended characters to a single same value; and mapping upper numerals and punctuation to a single same value.

9. The method of claim 1 wherein the plurality-to-one reductive mapping maps an eight bit character to twenty-eight values, the plurality-to-one reductive mapping comprising:

mapping upper and lower case letters of the English alphabet to a set of twenty-six different values;

mapping extended characters to a single same value; and mapping numerals and punctuation to a single same value.

10. A method in a computer system for generating models that each model text in one of a number of languages, the method comprising the steps of:

receiving a plurality of sequences of data values, each sequence of data values representing text in an identified language, each data value being one of a number of possible data values;

for each sequence of data values:

using a reductive mapping to map the data values of the sequence from the number of possible data values to target values among a smaller number of possible target values to produce a sequence of derived target values corresponding to the sequence of data values;

for each n-gram of possible target values:

counting the number of occurrences of the n-gram in the sequence of derived target values; and combining the counted number of n-grams of target values into a model for the language identified for the sequence of data values, the model reflecting the relative frequency of each n-gram of possible target values in all of the sequences of derived target values for which the language identified for the sequence of values is identified.

11. The method of claim 10, further comprising the steps of:

receiving an input sequence of data values representing text in an unknown language;

applying the reductive mapping to the input sequence of data values representing text in the unknown language to map the data values of the input sequence from the number of possible data values to a smaller number of target values to produce a sequence of derived target input values corresponding to the input sequence of data values representing text in the unknown language;

generating a characterization of the input sequence of data values representing text in the unknown language based on the sequence of derived target input values; and identifying the language of the input sequence of data values representing text in the unknown language based upon a comparison of the generated characterization to the generated models.

12. The method of claim 10, further comprising the step of adjusting the counts of the models to more effectively distinguish the models from one another by emphasizing distinguishing high-frequency features in the models and de-emphasizing non-distinguishing high-frequency features in the models.

13. The method of claim 12 wherein said adjusting comprises:

doubling an n-gram count for a particular n-gram in a model and subtracting, from the n-gram count, an average n-gram count for the particular n-gram across a plurality of models.

14. The method of claim 10 wherein the n-grams are unigrams comprised of a single target value.

15. The method of claim 10 wherein the n-grams are bigrams comprised of two target values adjacent in the sequence of target values.

16. The method of claim 15 wherein the n-grams are trigrams comprised of three target values adjacent in the sequence of target values.

17. A method in computer system for generating n-grams frequency data sets that each model text in a combination of one of a number of languages and one of a number of characters sets, the method comprising the steps of:

receiving a plurality of sequences of data values, each sequence of data values representing text in an identified language and in an identified character set, each data value being one of a number of possible data values;

for each sequence of data values:

using a reductive mapping to map the data values of the sequence from the number of possible data values to target values among a smaller number of possible target values to produce a sequence of derived target values corresponding to the sequence of data values;

for each n-gram of derived target values occurring in the sequence of derived target values corresponding to the sequence of data values:

counting the number of occurrences of the n-gram in the sequence of derived target values; and combining the counted number of n-grams of target values into an n-gram frequency data set for the combination of language and character set identified for the sequence of values, the n-gram frequency data set reflecting the relative frequency of each n-gram of derived target values in all of the sequences of derived target values for which the combination of language and character set identified for the sequence of values is identified.

18. A computer memory containing a data structure for identifying, from a sequence of initial values each among a plurality of possible initial values, the language of text represented by the sequence of initials values, the data structure comprising:

for each language:

for each of a plurality of possible n-grams of target values, each n-gram of target values being a fixed-length series of target values, two or more of the plurality of possible initial values being reductively mapped to each one ore more of the target values:

a value reflecting the frequency with which n-grams of initial values reductive mapped to the n-gram of target of tar get values occur in text of the language, such that the data structure may be compared to a characterization of an input text whose language is unknown to identify the language of the input text.

19. The computer memory of claim 18 wherein the data structure further contains, for each possible initial value, an identification of the possible target value to which the possible initial value is mapped.

20. For a plurality of byte values representing text in an unknown distinguish language in accordance with an unknown distinguished character set that associates each character glyph with one or more particular byte values, each byte value having a high-order bit that may be either on or off, a method in a computer system for identifying the distinguished language and distinguished character set, the method comprising the steps of:

counting the number of byte values of the plurality whose high-order bits are on;

if the high-order bits of more than a predetermined fraction of the byte values of the plurality are on, applying a first approach to identify the distinguished language and distinguished character set; and if the high-order bits of more than a predetermined fraction of the byte values of the plurality are not on, applying a second approach to identify the distinguished language and distinguished character set.

21. The method of claim 20 wherein the predetermined fraction is one-half.

22. The method of claim 20 wherein the step of applying the first approach comprises the step of:

comparing a two-dimensional characterization of the plurality of byte values to two-dimensional models each modeling a different combination of language and character set to identify the distinguished language and the distinguished character set, and wherein the step of applying the second approach comprises the steps of:

comparing a three-dimensional characterization of the plurality of byte values to three-dimensional models each modeling a different language to identify the distinguish language; and comparing a one-dimensional characterization of the plurality of byte values to one-dimensional models each modeling a different combination a character set and the identified distinguished language to identify the distinguished character set.

23. The method of claim 22 wherein the step of applying the first approach comprises the step of:

generating the two-dimensional characterization and two-dimensional models using a mapping that maps each byte value representing a letter characters to its own target value, maps each byte value having its high-order bit set to its own target value, and maps remaining byte values to a small number of additional target values, and wherein the step of applying the second approach comprises the step of:

generating the three-dimensional characterization and three-dimensional models using a mapping that maps each byte value representing a letter characters to its own target value and collectively maps byte values representing non-letter characters to a small number of additional target values; and generating the one dimensional characterization and two dimensional models using a mapping that maps each byte value having its high-order bit set to its own target value and maps remaining byte values to a small number of additional target values.

24. For a series of data values representing text in an unknown distinguished Latin-based language in accordance with one of a plurality of character sets for Latin-based languages, each character set associating character glyphs with particular data values, a method in a computer system for identifying the distinguished language, the method comprising the steps of:

for each distinct data value in the series, using a single common data value:

if the distinct data value does not represent the same character glyph in each of the plurality of character sets, transforming occurrences of the distinct data value in the series into the single common data value, such that, after the transforming step, data values that represent the same character glyphs in each of the plurality of character sets are still differentiated but data values that do not represent the same character glyphs in each of the plurality of character sets are no longer differentiated;

after transforming step, counting in the series of data values the number of occurrences of each distinct subseries of the series having a predetermined length; and identifying the distinguished language based upon the counts of distinct subseries of the series.

25. The method of claim 24 wherein the counting step counts the number of occurrences of each distinct subseries of the series having a length of three data values.

26. For a series of data values representing text in accordance with an unknown distinguished character set that associates character glyphs with particular data values, a proper subset of the data values constituting extended character values, a method in a computer system for identifying the distinguished character set, the method comprising the steps of:

determining the relative frequencies with which the extended character value occur in the series of data values;

for each of a plurality of candidate character sets, comparing the determined relative frequencies of extended character values with indications of relative frequencies of extended character values in text represented in accordance with the candidate character set; and on the basis of the comparison of the determined relative frequencies of extended character values, identifying the distinguished character set in accordance with which the series of data values represents text.

27. The method of claim 26 wherein the series of data values represents text in a known language, and wherein the plurality of candidate character sets is a proper subset of a larger multiplicity of character sets, and wherein each of the multiplicity of character sets is associated with one or more languages, the method further comprising the step of selecting as the plurality of candidate character sets those character sets among the multiplicity of character sets that are associated with the known language.

28. A method in a computer system for transforming a sequence of source values representing text into a sequence of target values that characterizes the sequence of source values in a manner useful for n-gram analysis techniques, the method comprising the steps of:

for each distinct source value occurring in the sequence of source values, identifying a single target value corresponding to the distinct source value, such that target value corresponds to one or more distinct source values and at least one target value corresponds to two or more distinct source values;

for each occurrence of the distinct source value in the sequence of source values, writing the target value identified as corresponding to the distinct source value to a position in the sequence of target values corresponding to the position of the occurrence of the distinct source value in the sequence of source values; and subjecting the sequence of target values to an n-gram analysis technique in order to analyze the representation of text constituted by the sequence of source values.

29. The method of claim 28 wherein the subjecting step subjects the sequence of target values to an n-gram analyst technique in order to identify a language used in the representation of text constituted by the sequence of source values.

30. The method of claim 28 wherein the subjecting step subjects the sequence of target values to an n-gram analysis technique in order to identify a character set in which the representation of text constituted by the sequence of source value is expressed.

31. The method of claim 28 wherein the subjecting step subjects the sequence of target values to an n-gram analysis technique in order to identify a character set and a language of the representation of text constituted by the sequence of source values.

32. The method of claim 28, further comprising the step of, in response to the subjecting step, detecting a characteristic of the representation of text constituted by the sequence of source values.

33. The method of claim 28, further comprising the step of, in response to the subjecting step, generating a model modeling a characteristic of the representation of text constituted by the sequence of source values.

34. The method of claim 28 wherein a portion of the distinct source values among the sequence of source values represent letters, and wherein a portion of the distinct source values among the sequence of source values represent extended characters, and wherein the identifying step includes the steps of:

for each distinct letter, identifying a single target value associated with the distinct letter as corresponding to any distinct source values representing the distinct letter;

identifying a single target value associated with the extended characters as corresponding to any distinct source values representing extended characters; and identifying a single target value as corresponding to any distinct source values representing neither a letter nor an extended character.

35. The method of claim 28 wherein a portion of the distinct source values among the sequence of source values represent letters, and wherein a portion of the distinct source values among the sequence of source values represent extended characters, and wherein the identifying step includes the steps of:

for each distinct letter, identifying a single target value associated with the distinct letter as corresponding to any distinct source values representing the distinct letter;

for each distinct extended character, identifying a single target value associated with the distinct extended character as corresponding to any distinct source values representing the distinct extended character; and identifying a single target value as corresponding to any distinct source values representing neither a letter nor an extended character.

36. The method of claim 28 wherein a portion of the distinct source values among the sequence of source values represent extended characters, and wherein the identifying step includes the steps of:

for each distinct extended character, identifying a single target value associated with the distinct extended character as corresponding to any distinct source values representing the distinct extended character; and identifying a single target as corresponding to any distinct source values not representing an extended character.

37. A computer memory containing a mapping data structure for transforming a sequence of source values representing text into a sequence of target values that characterizes the sequence of source values in a manner useful for n-gram analysis techniques, the source values of the sequence being taken from a plurality of possible source values, the data structure identifying, for each possible source value, a single target value to which the possible source value is to be mapped, such that the data structure may be used to transform a sequence of source values representing text into a sequence of target values, the range of target values in the sequence of target values being smaller than the range of source values in the sequence of source values, the sequence of target values characterizing the sequence of source values in a manner that is useful for n-gram analysis techniques.

38. A method in a computer system for identifying each of a plurality of languages occurring in a digital document representation comprising a sequence of data values, the method comprising the steps of:

dividing the sequence of data values comprising the digital document representation into a plurality of contiguous, mutually exclusive subsequences;

identifying the predominant language used in each subsequence of the digital document representation; and indicating that the digital document representation includes each of the identified languages.

39. The method of claim 38 wherein the dividing step divides the sequence of data values into subsequences each containing a number of data values typically required to represent a sentence.

40. The method of claim 38 wherein the dividing step divides the sequence of data values into subsequences each containing a number of data values typically required to represent a paragraph.

41. The method of claim 38 wherein the indicating step includes the step of sorting the identified languages based on the number of subsequences in which the identified languages are identified.

42. For a series of character values representing text in one or more languages in accordance with a character set that defines a character value for each represented character glyph, ranges of identified character values being defined for groups of characters that commonly occur in a single language or a group of languages, a method in a computer system for identifying a primary language of the text represented by the series of character values, the method comprising the steps of:

for each range, determining the number of character values in the series of character values that are within the range;

selecting the range containing the largest number character values in the series of character values; and identifying the language or group of languages in which characters within the selected range commonly occur as the primary language of the text represented by the series of character values.

43. The method of claim 42, further comprising the steps of, where a group of languages is identified:

generating a characterization of the series of character values indicating the relative frequency of n-grams in the text represented by the series of character values;

for each language of the group, retrieving a statistical model of the language indicating the relative frequency of n-grams in text documents in which the language is predominant, and comparing the statistical model for the language to the characterization of the series of character values to obtain a quantitative score for the language reflecting the level of similarity between the statistical model of the language and the characterization of the series of character values; and identifying the language having the largest score as the primary language of the text represented by the series of character values.

44. The method of claim 43 wherein the statistical language models are compiled from the text documents expressed in a first character set, and wherein the process of compiling statistical language models includes the step of mapping source values of the first character set to a group of target values, and wherein the character set in which the series of character values represents text is a second character set distinct from the first character set, and wherein the generating step includes the step of mapping values of the second character set to the same group of target values to which the source values of the first character set are mapped.

45. The method of claim 44 wherein the first character set is the Unicode character set and the second character set is a character set for expressing Latin-based language other than the Unicode character set.

46. The method of claim 43 wherein the statistical language models and the characterization of the series of character values are both generated using a mapping of character values of the character set to a smaller number of target values, the method further comprising the steps of generating the mapping by:

for each language in the language group:

reading documents for which the language is identified as the predominant language;

defining a single target value for the character values read exclusively in documents for which the language is identified as the predominant language; and defining one or more target values for the character values read mostly in documents for which the language is identified as the predominant language.

47. The method of claim 41 wherein the languages of the language group each have an exclusive character value range, further including the step of:

defining a single target value to which are mapped the character values in the exclusive character value range of the language.

48. The method of claim 43, further comprising the step of defining one or more target values for character values for which no target values are other wise defined.

49. A computer memory containing a mapping data structure for transforming a sequence of source values representing text into a sequence of target values that characterizes the sequence of source values in a manner useful to differentiated text of related languages using n-gram analysis techniques, the source values of the sequence being taken from a plurality of possible source values, the data structure identifying, for each possible source value, a single target value to which the possible source value is to be mapped, the target value being selected based upon the relative tendency of the possible source value to appear in sample text of only one of the related languages, such that the data structure may be used to transform a sequence of source values representing text into a sequence of target values, the range of target values in the sequence of target values being smaller than the range of source values in the sequence of source values, the sequence of target values characterizing the sequence of source values in a manner that is useful for n-gram analysis techniques.

50. A computer-implemented method of analyzing an input digital text to differentiate between digital text in a Latin-based single byte character set and digital text in a multiple byte character set or a non-Latin based character set, the method comprising:

analyzing bytes of the input digital text to determine whether at least a predetermined fraction of the bytes of the input digital text are apparently extended characters; and choosing between determining the input digital text is digital text in a Latin-based single byte character set and determining the input digital text is digital text in a multiple byte character set or a non-Latin based character set based on whether it is determined at least the predetermined fraction of the bytes of the input digital text are apparently extended characters, wherein it is determined the input digital text is digital text in a multiple byte character set or a non-Latin based character set responsive to determining at least the predetermined fraction of the bytes in the input digital text are apparently extended characters.

51. The method of claim 50 wherein the predetermined fraction is one-half.

52. A computer-implemented method of detecting a language of a text comprising a string of original characters, wherein the language of the text is one out of a group of Latin-based languages, wherein at least two languages in the group of Latin-based languages are represented by different single byte character sets wherein one or more same byte values map to different characters in the different single byte character sets and one or more same byte values map to a same character in the different single byte character sets, the method comprising:

reductively mapping byte values in the string of original characters in the text to a smaller set of character values differentiating only letters of the English alphabet irrespective of case to generate a string of transformed characters, wherein extended characters are mapped to a single character value in the string of transformed characters;

identifying frequencies of n-gram within the string of transformed characters; and applying a statistical analysis on the frequencies of n-grams within the string of transformed characters to detect the language of the text out of the group of Latin-based languages.

53. The method of claim 52 wherein the statistical analysis comprises comparing the frequencies of n-grams within the string of transformed characters with frequencies of n-grams in a transformed set of training texts, wherein the training texts are transformed by reductively-mapping to values differentiating only letters of the English alphabet irrespective of case.

54. A computer-implemented method for detecting the language and character set of a text in a Latin-based language, the method comprising:

generating a first transformed version of the text that negates differentiating among extended characters;

conducting a statistical analysis on the first transformed version of the text negating differentiation among extended characters to identify the language of the text and identify a plurality of candidate character sets associated with the language of the text;

generating a second transformed version of the text that negates differentiation among non-extended characters; and conducting an n-gram analysis on the second transformed version of the text negating differentiating among non-extended characters to identify a character set of the text, wherein the character set of the text is selected from the plurality of candidate character sets associated with the language of the text identified by conducting the n-gram analysis on the first transformed version of the text negating differentiation among extended characters.

55. The method of claim 54 wherein the first transformed version ignores letters other than the letters "A" through "Z" of the English alphabet, irrespective of case.

\* \* \* \* \*

UNITED STATES PATENT AND TRADEMARK OFFICE
CERTIFICATE OF CORRECTION

PATENT NO. : 6,157,905
DATED : December 5, 2000
INVENTOR(S) : Powell

It is certified that error appears in the above-identified patent and that said Letters Patent is hereby corrected as shown below:

Title page,
References Cited, under OTHER PUBLICATIONS, the following should appear:
-- Beesley, "Language Identifier: A Computer Program for Automatic Natural-Language Identification of On-Line Text," Languages at Crossroads: Proceedings of the 29th Annual Conference of the American Translators Association, 1988, pp. 1-21.
Vogt et al., "Adaptive Logic Networks for Machine-Printed Character Recognition," Environmental Research Institute of Michigan, April 1994, pp. 1-19.
Cavnar, "N-Gram-Based Text Filtering for TREC-2," Environmental Research Institute of Michigan, September 1993, pp. 1-9.
Cavnar et al., "N-Gram-Based Text Categorization," Environmental Research Institute of Michigan, April 1994, pp. 1-14. --.

Column 1,
Line 62, "Wile" should read -- While --.

Column 5,
Line 55, "languages 133, and" should read -- languages, and --.
Line 56, "representation whose" should read -- representation 133 whose --.

Column 8,
Line 66, "0x4F" should read -- 0x4F --.

Column 9,
Line 46, "Latin-Baseed" should read -- Latin-Based --.
Line 55, 0xFF" should read -- 0xFF --.

Column 16,
Line 37, "1005" should read -- 1105 --.

Column 18,
Line 4, "characterized" should read -- characterizing --.
Line 7, "of whose" should read -- of languages whose --.
Line 38, "mapping upper numerals" should read -- mapping numerals --.

Column 19,
Line 45, "in computer" should read -- in a computer --.
Line 45, "n-grams" should read -- n-gram --.

UNITED STATES PATENT AND TRADEMARK OFFICE
CERTIFICATE OF CORRECTION

PATENT NO. : 6,157,905
DATED : December 5, 2000
INVENTOR(S) : Powell

It is certified that error appears in the above-identified patent and that said Letters Patent is hereby corrected as shown below:

Column 20,
Line 10, "initials" should read -- initial --.
Lines 15-16, "to each one ore more" should read -- to one or more --.
Line 18, "reductive" should read -- reductively --.
Line 19, "tar get" should read -- target --.
Line 29, "distinguish" should read -- distinguished --.
Line 60, "distinguish" should read -- distinguished --.
Line 63, "combination a" should read -- combination of a --.

Column 21,
Line 8, "step" should read -- steps --.
Line 40, "after transforming" should read -- after the transforming --.
Line 57, "value" should read -- values --.

Column 22,
Line 16, "that target" should read -- that each target --.
Line 41, "value" should read -- values --.

Column 23,
Line 30, "target as" should read -- target value as --.

Column 24,
Line 52, "language" should read -- languages --.

Column 25,
Line 1, "41" should read -- 43 --.
Lines 3-4, "including the step of:
            defining a single target value" should read
-- including the step of:
       for each language:
            defining a single target value --.
Line 9, "other wise" should read -- otherwise --.
Line 10, "a mapping" should read -- a custom mapping --.
Lines 13-14, "differentiated" should read -- differentiate --.

UNITED STATES PATENT AND TRADEMARK OFFICE
CERTIFICATE OF CORRECTION

PATENT NO. : 6,157,905
DATED : December 5, 2000
INVENTOR(S) : Powell

It is certified that error appears in the above-identified patent and that said Letters Patent is hereby corrected as shown below:

<u>Column 26,</u>
Line 16, "n-gram" should read -- n-grams --.
Line 33, "differentiating" should read -- differentiation --.
Line 44, "differentiating" should read -- differentiation --.

Signed and Sealed this

Twenty-second Day of January, 2002

Attest:

JAMES E. ROGAN
*Attesting Officer*  *Director of the United States Patent and Trademark Office*